US012657907B2

(12) United States Patent
Romero et al.

(10) Patent No.: US 12,657,907 B2
(45) Date of Patent: Jun. 16, 2026

(54) PLANET OBSERVATION SYSTEM AND METHOD FOR REMOTE SENSING

(71) Applicant: Urugus S.A., Montevideo (UY)

(72) Inventors: Eduardo Romero, Buenos Aires (AR); Gerardo Gabriel Richarte, Barcelona (ES); Matias Alejo Grana, Barcelona (ES)

(73) Assignee: Urugus S.A., Montevideo (UY)

( * ) Notice: Subject to any disclaimer, the term of this patent is extended or adjusted under 35 U.S.C. 154(b) by 316 days.

(21) Appl. No.: 18/458,831

(22) Filed: Aug. 30, 2023

(65) Prior Publication Data

US 2024/0144670 A1     May 2, 2024

(30) Foreign Application Priority Data

Sep. 1, 2022     (EP) ..................................... 22382819

(51) Int. Cl.
| | |
|---|---|
| *G06V 20/13* | (2022.01) |
| *B64G 1/24* | (2006.01) |
| *G06T 7/60* | (2017.01) |

(52) U.S. Cl.
CPC ........... *G06V 20/13* (2022.01); *B64G 1/2423* (2023.08); *G06T 7/60* (2013.01); *G06T 2207/10032* (2013.01)

(58) Field of Classification Search
CPC .... G06V 20/13; B64G 1/2423; B64G 1/1021; G06T 7/60; G06T 2207/10032
See application file for complete search history.

(56) References Cited

U.S. PATENT DOCUMENTS

| | | | |
|---|---|---|---|
| 2021/0107688 A1* | 4/2021 | Hu ........................ | B64G 1/1021 |
| 2021/0261274 A1* | 8/2021 | Messager .............. | G01S 13/955 |
| 2023/0080986 A1* | 3/2023 | Mukae ................. | B64G 1/2429 |
| | | | 244/158.4 |

FOREIGN PATENT DOCUMENTS

CN     113758467 B  *  6/2023  ............. G01C 11/00

OTHER PUBLICATIONS

S. Ahmed, H. R. Warren, M. D. Symonds and R. P. Cox, "The Radarsat System," in IEEE Transactions on Geoscience and Remote Sensing, vol. 28, No. 4, pp. 598-602, Jul. 1990, doi: 10.1109/TGRS. 1990.572961. (Year: 1990).*

(Continued)

*Primary Examiner* — Stephen R Koziol
*Assistant Examiner* — Ashley Hytrek
(74) *Attorney, Agent, or Firm* — Lee & Hayes, P.C.

(57) ABSTRACT

Systems, methods and devices for planet observation are provided. A planet observation system is provided, comprising at least one vehicle comprising one or more sensors on board at least one vehicle, the at least one vehicle configured to follow a trajectory around a celestial body; and a control system comprising memory and a processor(s), the memory including one or more modules that are executable by the processor(s) to: direct, based at least in part on a geometric ground pattern covering partially or wholly a surface or volume of the celestial body, the one or more sensors to collect data; and store the data in memory on-board the at least one vehicle and/or transmit the data to another location. A computer-implemented planet observation method and a computer-implemented method of designing a geometric ground pattern for at least one vehicle configured to orbit around a celestial body are also provided.

20 Claims, 6 Drawing Sheets

(56)          References Cited

OTHER PUBLICATIONS

Paek, S. W., Kronig, L. G., Ivanov, A. B., & de Weck, O. L. (2018). Satellite constellation design algorithm for remote sensing of diurnal cycles phenomena. Advances in Space Research, 62(9), 2529-2550. (Year: 2018).*

USGS. (2019). Landsat 7 (L7) Data Users Handbook (2nd ed.). (Year: 2019).*

Tao, P., Xi, K., Niu, Z., Chen, Q., Liao, Y., Liu, Y., . . . & Zhang, Z. (2022). Optimal selection from extremely redundant satellite images for efficient large-scale mapping. ISPRS Journal of Photogrammetry and Remote Sensing, 194, 21-38. (Year: 2022).*

* cited by examiner (A)                    (B)

402

504

506

502

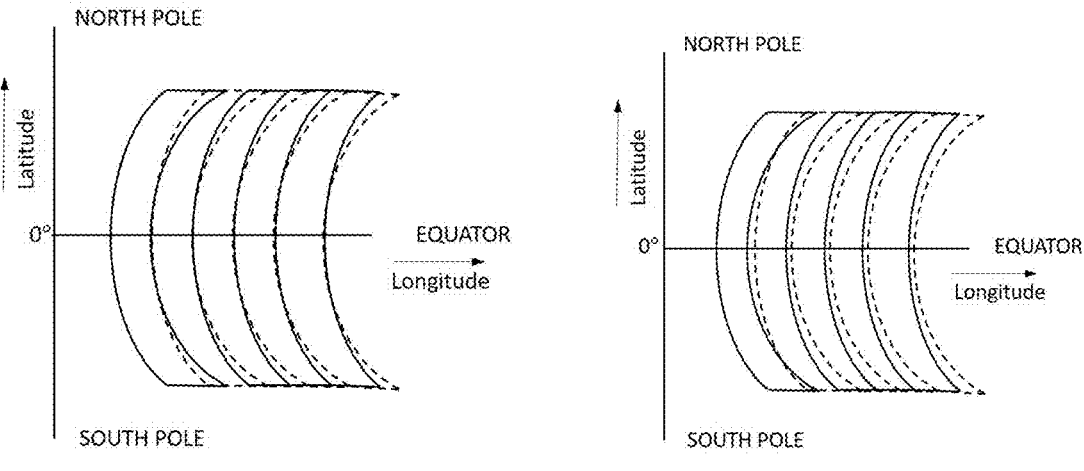
FIGURE 9A                                    FIGURE 9B
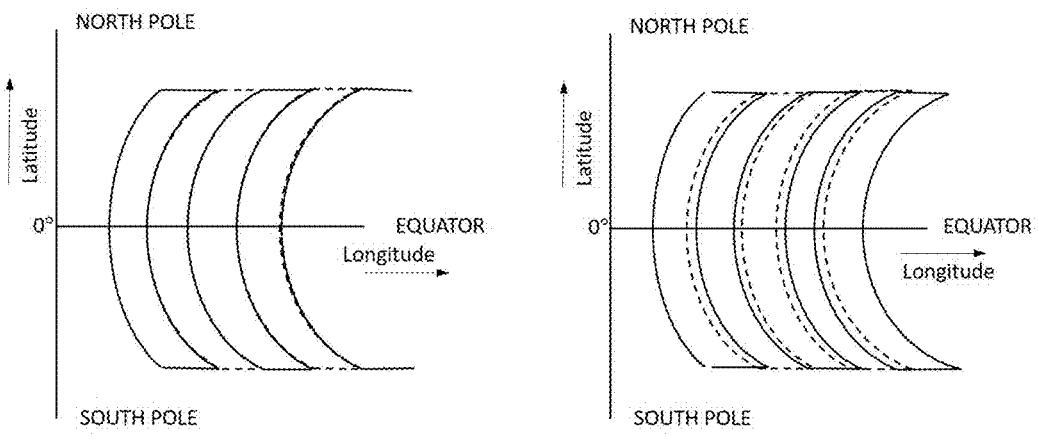
FIGURE 9C                                    FIGURE 9D
1000
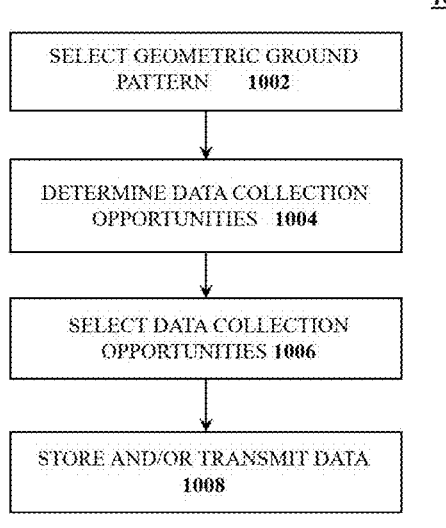
FIGURE 10

PLANET OBSERVATION SYSTEM AND METHOD FOR REMOTE SENSING

CROSS REFERENCE TO RELATED APPLICATIONS

The present application claims priority to EP. Patent Application No. 22382819.5, filed on Sep. 1, 2022, and entitled "PLANET OBSERVATION SYSTEM AND METHOD FOR REMOTE SENSING", the entire contents of which are incorporated herein in its entirety by reference.

TECHNICAL FIELD

The present disclosure relates generally to systems and methods for acquisition of data or information from remote locations. More particularly, the present disclosure is related to planet observation systems and methods for observing the surface or the atmosphere of celestial bodies (in particular, planets) systematically and efficiently, including cases of predetermined observation frequencies.

BACKGROUND

Artificial satellites are widely used for different applications such as Earth observation, communication, monitoring, and so forth. In particular, the increasing number of observation or monitoring satellites orbiting the Earth with the intention of collecting data covering large areas also increases the amount of data that can be gathered. Despite the benefit of being able to gather more data and cover vast areas, a compromise arises between the cost, size and weight of the satellites and the amount of data that they are able to collect, store, download or process. The problems noted above become exacerbated when the purpose is to obtain data from large areas on the surface of the Earth with small and low cost satellites with limited resources.

The currently existing techniques for collecting data from the surface of the Earth reveal the complexity of finding a process suitable for systematically collecting data. For example, traditional approaches for capturing images in Earth observation missions covering large areas are based on a swath propagation covering. Basically, in this type of approach, the orbit is propagated and the instrument's footprint (sometimes called instrument's swath) is computed for the relevant time range, with different options of off-nadir angles. Then, these footprints are intersected with the area to get the potential capture opportunities that could be used to cover it. These can be redundant, so a subset is selected and captures are reduced to avoid unnecessary overlapping. Generally speaking, the use of the spacecraft payload propagated footprint at nadir (or including some discrete options of off-nadir angles) is a common practice in the remote sensing missions, such as Compressed Large-scale Activity Scheduling and Planning (CLASP) system used for mission analysis and Mars missions like Thermal Emission Imaging System (THEMIS). This approach can be satisfactory for missions where the instrument's swath is large enough to allow a rather large degree of overlapping between consecutive captures. Also, if the mission includes more than one satellite, the way to ensure the satellites can work efficiently together is usually to introduce very strict orbit maintenance requirements, for example, the SAtélite Argentino de Obseryación COn Microondas (SAOCOM) mission or the COSMO-SkyMed mission.

For missions that aim to collect data from large areas, map or remap the entire world, the usual approach is to leave the satellites capturing at nadir in a continuous way, with payloads acquiring data when the illumination and other conditions are met. For this, the satellites are placed in convenient sun synchronous quasi-polar orbits that are able to scan the globe while it turns around below the orbit. Moreover, in many cases repeating ground track orbits are used, to ensure the same coverage pattern is repeated over and over. Perhaps the most famous example of this is the Landsat mission, where the path-row indexes basically identify a given orbit in the repeating ground track pattern, and the latitude range. For example, the Landsat 8 satellite orbits the Earth in a sun-synchronous, near-polar orbit, imaging the entire surface of the Earth every 16 days. As the satellite moves along its path, the sensors are continuously scanning the surface below, generating squares centered on the orbital path (but tilted clockwise when viewed on the Universal Transverse Mercator, UTM, projection). Again, precise orbit maintenance operations are a must to ensure the orbit characteristics do not change.

One of the main drawbacks of operating in this manner is the resulting redundancy of data that is captured while collecting data from the Earth since there is a considerable overlap at high latitudes. That is, to ensure the whole area of interest is fully captured during the repeating ground track period, the geographical areas located in high latitudes are captured more often. This implies a waste of resources if the objective is to have a uniform remapping, in the sense that the amount of information collected from all the areas must be similar and there is no need for more redundant information in certain areas than others. This lack of efficiency severely impacts the performance of the satellite as an entity but also as part of a constellation or fleet of satellites, given that two or more satellites may be capturing the same data at the poles, wasting resources since they are performing the same task as well as for storing, processing and/or transmitting duplicate data, overcrowding the uplink and downlink connections to the ground or to other satellites.

Another drawback of operating as in traditional approaches based on a swath propagation covering is that this technique is not robust to small changes in the orbit or to the lack of synchronization of orbits in a satellite constellation. Small perturbations in the orbit change the footprint and introduce some degree of difference between consecutive captures of the same orbit in the repeating ground track, which can be catastrophic for instruments with thin swaths where this error can be a significant percentage of the complete swath.

The data redundancy owing to the overlap at high latitudes and the change of footprint in repeating ground tracks due to the perturbations may be neglected in missions where the swath is large enough, and the rate of data generation is small, or the download capabilities can support the redundancy. However, the traditional approach of capturing all the time at nadir with a sun-synchronous low-orbit fleet is inefficient when the purpose is to obtain high resolution data from large areas with small and low cost satellites with limited resources. Hence, there is a need to optimize the acquisition of data by satellites (single satellites or satellite systems comprising two or more satellites) by designing a new approach in terms of the coverage, reducing the collection of duplicate information to increase the efficiency of the data collection.

SUMMARY

Considerable advantages can be realized using the methods and systems described herein to optimize the collection or acquisition of data or information from remote locations, that is, when the data or information to be collected is located distant or without making physical contact with the means for collecting the data (e.g., remote sensing devices or systems) such as imaging data collected from cameras on-board satellites. The increase of efficiency in acquiring data from remote locations by determining geometric ground patterns and planning the data acquisition, based at least in part on geometric ground patterns as described herein, to collect data from the surface or atmosphere of a celestial body can provide several technical advantages. Firstly, the efficiency of the planning or acquisition plan based on a determined geometric ground pattern is translated into the alleviation or reduction of the requirements of the satellites necessary to cover some or the entire surface or atmosphere. For example, based on the geometric ground pattern, the satellites may require a distribution of shorter data capture durations to collect data from Earth compared to traditional approaches, leading to a reduction in the power needed and the thermal stress undergone by the satellites to execute the acquisition plan.

Secondly, the geometric ground pattern may be designed so as to reduce the overlap of acquired data, so there is a resultant reduction in the data to be processed in orbit or on the ground, and/or in the data to be downloaded or transferred to the ground stations or to other satellites or vehicles, reducing or minimizing the net bandwidth utilization. As opposed to what prior art solutions do to collect data from large areas of the surface of the Earth, which is to propagate the orbit in relation to the instrument swaths and use these geometries to cover the areas, the methods and systems disclosed in the present disclosure comprise defining a proper coverage of the area by determining a geometric ground pattern which divides a certain surface or the whole surface of the celestial body in geometric fragments. The geometric fragments may be of any geometry (e.g. stripes) so that the satellites of the constellation can eventually collect data (e.g. capture images) in some orbit by executing a proper attitude maneuver. In other words, the satellite(s) may maneuver within its orbit so that data can be collected based on the geometric ground pattern. Then, to determine the acquisition plan for the fleet, the methods and systems disclosed herein may search what fragments can be captured by each satellite, considering several constraints (such as maximum off nadir along the capture). The geometric ground pattern is built considering some general aspects of the orbits and instruments (e.g. field of regard), and the coverage of the areas is determined based on the geometric ground pattern. This novel approach allows to gain valuable flexibility in the geometries that may be used to cover the areas, because the options are no longer limited to the propagated instrument swaths. The words fleet and constellation are used interchangeably throughout the Detailed Description.

Thirdly, determining a geometric ground pattern considering some general aspects of the orbits and instruments to determine the coverage of the areas instead of propagating the orbit to get the instrument swaths and use these geometries to cover the areas, provides systems and methods that are robust to small differences in the orbits of the satellites of the fleet and to small orbit perturbations. That is, the approach is robust at least in terms of supporting fleets with satellites in orbits with different local time of ascending nodes (ltan) and different true anomalies (tas, that is, the phasing), or satellites subject to perturbing forces. Furthermore, this approach allows a robust mission design, because the remapping capabilities can be incrementally augmented by launching more and more satellites, even with launches shared with other missions in different orbits.

In a non-limiting example, planning the data collection based at least in part on a geometric ground pattern may reduce the overloading of satellite resources, as illustrated in the following scenario. A satellite may plan to capture images while orbiting over a predetermined number of geometric fragments belonging to a geometric ground pattern so that the duration during which the sensors have to capture images does not exceed its optimal operation. It is also possible to determine the size and/or shape of the geometric fragments based on the requirements for the satellites related to the capture or transmission of images covering these geometric fragments such as capture frequency, storage, download bandwidth, or any other requirement related to the captures. Furthermore, by determining coverage of areas more efficiently based on a geometric ground pattern, the fleet may cover the same area with less total acquisition time.

In another non-limiting example, planning the data collection based at least in part on a geometric ground pattern may maximize the bandwidth utilization, as illustrated in the following scenario. The systems and methods may control the overlap between the geometric fragments using convenient fragment geometries. For example, it is possible to minimize the overlap between the geometric fragments of the geometric ground pattern so that unnecessary overlapping in areas of less importance may be reduced to a minimum. It is also possible to increase the overlap in particular areas, such as big cities or points of interest like a volcano, so that the data collection opportunities also increase. Hence, the acquisition plan for the fleet based on the geometric ground pattern may recapture some areas more frequently than others regulating in this manner the redundancy and the amount of data that is captured and that may be transmitted using the available bandwidth. In some implementations, the satellites may decide which data to download to optimize the bandwidth utilization, since there are more captures of the same area from which to choose, due to the overlap of the geometric fragments. Additionally or alternatively, the satellites may use a geometric ground pattern to plan the captures with predetermined degrees of overlap, but may dynamically choose the geographical areas where the overlapping of geometric fragments lay, so that even though the geometric fragments forming the geometric ground pattern have a fixed relation between them, the geographical areas (and hence the data redundancy) may be selected by the satellites by changing the location of the geometric fragments with respect to the surface of the celestial body. This is particularly useful in situations in which areas or points which were considered of low importance or priority suddenly become of high importance or high priority, for example due to an environmental event, political reasons, or any other reason that may change the need to obtain information from that area or point. By planning the data collection based on a geometric ground pattern so that the sensors collect data over geometric fragments with reduced overlap, the satellite avoids capturing duplicate data and transmitting duplicate data while communicating with ground stations or with other satellites. Similarly, by planning the data collection based on a geometric ground pattern having areas of increased overlap, it is possible to select where to collect more data and then decide what to download. This is useful for example in areas which are frequently covered by clouds, hence the satellites may plan the captures using a geometric ground pattern having more overlap in those areas, or placing the areas of more overlap of the geometric ground pattern in those areas, so that the satellite has more capture opportunities over those areas and may select which capture provides an image free of clouds or with a reduced content of clouds, and may select to download only the images having a content of cloud below a predetermined threshold, optimizing the bandwidth utilization while transmitting the data to a ground station or to another satellite. Furthermore, there is a gain in flexibility since it is possible to choose where to add this redundancy and it is no longer arbitrarily given by the orbits.

In another non-limiting example, collecting data based on geometric ground patterns allows setting efficient planet (or another celestial body) observation systems designed to plan the acquisition of data at predetermined frequencies such as monthly, weekly, daily, or any period of time, and in some instances continuously, either revisiting regions or mapping the part or the entire surface of the planet. Given the robustness of the systems and methods, it is even possible to take advantage of any change in the orbit characteristics by adding the possibility of acquiring fragments that were not included in an original or previous planning.

In another non-limiting example, the geometric ground patterns may be uniform geometric ground patterns (in whole or in part) so that not only the data collection rate of a uniform geometric ground pattern may be made variable depending on the zone, but also, each data collection (a.k.a. data acquisition) may be split in orbit and downloaded in different moments. This allows giving more priority and downloading first some portions of each data collection according to tasking requests over specific targets.

The present disclosure provides a planet observation system, the system comprising: at least one vehicle comprising one or more sensors, the at least one vehicle configured to follow a trajectory around a celestial body; and a control system comprising memory and one or more processors, the memory including one or more modules that are executable by the one or more processors to: direct, based at least in part on a geometric ground pattern covering partially or wholly a surface or volume of the celestial body, the one or more sensors to collect data; and store the data in memory on-board the at least one vehicle and/or transmit the data to another location.

According to embodiments, the geometric ground pattern comprises geometric fragments, and collecting data comprises collecting data from an area at least partially covered by at least one of the geometric fragments in the pattern.

According to embodiments, the one or more modules are further executable by the one or more processors to determine the geometric ground pattern by segmenting a 2-dimensional representation of the surface of the celestial body into the geometric fragments, wherein the geometric fragments longitudinally extend in a direction coverable by the at least one vehicle's trajectory. In some instances, the plurality of geometric fragments longitudinally extend in a direction coverable partially or in whole by the at least one vehicle's trajectory According to embodiments, the geometric fragments overlap each other less than a threshold level of overlap at the equator's latitude.

According to embodiments, the one or more modules are further executable by the one or more processors to determine the geometric ground pattern as a pattern of a plurality of geometric fragments with an overlap with each other at the equator's latitude being less than a threshold level of overlap, and optionally, by removing, from first geometric fragments of the geometric fragments, sections that overlap sections of other geometric fragments more than the threshold level of overlap at latitudes higher than the equator.

According to embodiments, the vehicle's trajectory follows a sun-synchronous orbit.

According to embodiments, the one or more modules are further executable by the one or more processors to determine the geometric ground pattern based on: defining at least one reference geometric fragment following a direction coverable by the orbit over predetermined areas on the surface of the celestial body, and defining an additional geometric fragment extending adjacent to the at least one reference geometric fragment, with an overlap with the reference geometric fragment along the longitudinal direction being less than a threshold level of overlap. Optionally, wherein an overlap with the reference geometric fragment along the direction transverse to the longitudinal direction is less than a threshold level of overlap along the longitude of the equator.

According to embodiments, the at least one reference geometric fragment has a shape longitudinally extending over predetermined areas over the surface of the celestial body, and the additional geometric fragment and the at least one reference geometric pattern have the respective bordering edges at a same border distance apart at every point along the respective bordering edges. The longitudinal shape refers to a shape having a longitudinal axis and a transverse axis, the longitudinal axis being bigger than the transverse axis.

According to embodiments, the one or more modules are further executable by the one or more processors to determine the geometric ground pattern based on determining that the additional geometric fragment overlaps with another geometric fragment more than the threshold level of overlap at any point, and at least partially removing overlapping point or points from the geometric ground pattern.

According to embodiments, the one or more modules are further executable by the one or more processors to determine the geometric ground pattern so that it is a fixed geometric ground pattern.

According to embodiments, the one or more modules are further executable by the one or more processors to determine the geometric ground pattern dynamically, based at least in part on information about previous data collections or heatmaps.

According to embodiments, the one or more modules are further executable by the one or more processors to determine the geometric ground pattern based on a heatmap wherein the heatmap includes information of at least one of indicating an aging of a point on or above the surface of the celestial body, one or more geographical areas of interest to clients, one or more applications, one or more tasks, or a number of tasks to be performed by the at least one vehicle.

According to embodiments, the geometric ground pattern is determined as a pattern of a plurality of geometric fragments and is further determined dynamically by determining one or more overlapping zones and/or a degree of overlap between the plurality of geometric fragments; and optionally by associating the overlapping zones and/or the degree of overlap with areas or points on or above the surface of the celestial body.

According to embodiments, the geometric ground pattern comprises a plurality of geometric fragments and the one or more modules are further executable by the one or more processors to assign at least one geometric fragment from the plurality of geometric fragments to at least one vehicle; determine, based at least in part on the at least one geometric fragment, at least one curve function, determine, based on the at least one curve function, attitude maneuvers; orient the one or more sensors using, at least in part, the attitude maneuvers; wherein the curve function provide at least one point on the surface of the celestial body of the at least one geometric fragment and the one or more sensors are oriented towards the at least one point on the surface of the celestial body.

According to embodiments, the one or more modules are further executable by the one or more processors to determine a start time and/or an end time for collecting data.

According to embodiments, the at least one curve function is at least one polynomial including one or more coefficients describing one or more points on the surface of the Earth defining the at least one geometric fragment over which the satellite has to collect data.

According to embodiments, the one or more modules are further executable by the one or more processors to select at least one opportunity, per orbit, per satellite, to collect data over one or more geometric fragments of the geometric ground pattern, optimizing a metric; optionally wherein the metric is a metric associated with the data collection of a plurality of vehicles including the at least one vehicle, and is at least one of a maximum area over which the at least one vehicle collects data, or an aging value of a geometric fragment, or a combination of both.

According to embodiments, directing the one or more sensors to collect data may further comprise determining attitude maneuvers including variable off-nadir angles, ONAs, towards a specific area of the celestial body covering at least one geometric fragment of the geometric ground pattern, including orienting the one or more sensors within an angle range with respect to a nadir direction.

According to embodiments, the system comprises a plurality of vehicles, and wherein the plurality of vehicles orbit in different sun-synchronous orbital planes having altitudes differing from each other less than an altitude difference threshold, and inclinations differing from each other less than an inclination difference threshold.

According to embodiments, the plurality of vehicles form a constellation and the one or more modules are further executable by the one or more processors to determine the geometric ground pattern based on the configuration of the plurality of vehicles within the constellation, and/or on the characteristics of the one or more sensors onboard the vehicles.

According to embodiments, the constellation comprises artificial satellites or spaceships, or combinations thereof.

The present disclosure provides a computer-implemented planet observation method, the method comprising: collecting, by one or more sensors onboard at least one vehicle following a trajectory around a celestial body, data based on a geometric ground pattern covering partially or wholly a surface or volume of the celestial body; and storing the data in memory onboard the at least one vehicle and/or transmitting the data from the at least one vehicle to another location.

According to embodiments, the method further comprises determining the geometric ground pattern, wherein the method preferably comprises determining the geometric ground pattern as a dynamic ground pattern based on previous information stored or collected by the at least one vehicle, or as a fixed geometric ground pattern.

According to embodiments, the vehicle's trajectory follows a sun-synchronous orbit.

According to embodiments, determining the geometric ground pattern comprises: a) defining at least one reference geometric fragment having a shape longitudinally extending over predetermined areas over the surface of the celestial body following a direction coverable by the trajectory over said predetermined areas; and b) based at least in part on mathematical calculations and on characteristics of the at least one reference geometric fragment, defining an additional geometric fragment extending adjacent to the at least one reference geometric fragment, with an overlap with the reference geometric fragment along the longitudinal direction being less than a threshold level of overlap.

According to embodiments, the method further comprises determining the overlap based on a resilience factor, and wherein the overlap has the same value at all points along the longitudinal direction between the additional geometric fragment and the reference geometric fragment, or wherein the overlap has different values at different points along the longitudinal direction.

According to embodiments, the method further comprises a step c) of determining whether the additional geometric fragment overlaps another geometric fragment more than the threshold level of overlap at any point within the geometric ground pattern, and at least partially removing the overlapping point or points from the additional geometric fragment.

According to embodiments, the method further comprises: generating a first and a second reference geometric fragments having a shape longitudinally extending over predetermined areas over the surface of the celestial body following a direction coverable by the orbit over said predetermined areas, and separated from each other a first distance at the equator's latitude, based at least in part on mathematical calculations and on characteristics of the first and second reference geometric fragments, defining third and fourth geometric fragments such that the third geometric fragment longitudinally extends adjacent to the first reference geometric fragment and the fourth geometric fragment longitudinally extends adjacent to the second reference geometric fragment, wherein the third and fourth geometric fragments are at a second distance from each other at the equator's latitude, the second distance being lower than the first distance, if the third and fourth geometric fragments overlap with each other more than a threshold level of overlap at any point within the geometric ground pattern, at least partially removing the overlapping point or points from the third and/or fourth geometric fragments, and repeating steps b) and c) to define additional geometric fragments until the additional geometric fragments overlap each other at the equator's latitude a certain threshold level of overlap.

According to embodiments, the method further comprises repeating steps a)-d) for different areas covering the surface of the celestial body, until the surface of the celestial body is covered by the geometric ground pattern.

The present disclosure provides a computer-implemented method of designing a geometric ground pattern for at least one vehicle configured to orbit around a celestial body, the method comprising the steps of: a) defining a plurality of corridor reference geometric fragments being at a first distance from each other at a latitude corresponding to the equator, b) defining at least one additional geometric fragment for each corridor reference geometric fragment, such that each of the additional geometric fragments longitudinally extends respectively adjacent to one reference geometric fragment, wherein the additional geometric fragments are at a second distance from each other, lower than the first distance, and, c) if the additional geometric fragments overlap with each other more than a threshold level of overlap at any point within the geometric ground pattern, at least partially removing the overlapping point or points from the additional geometric fragments. The method may further comprise repeating steps b) and c) to define additional geometric fragments adjacent to at least one of the previously defined additional geometric fragments, until the additional geometric fragments overlap each other at the equator's latitude a certain threshold level of overlap or until covering a predetermined area on the surface of the celestial body.

According to embodiments, the method further comprises defining at least one reference path having a shape covering predetermined areas on or over a surface of the celestial body following a direction coverable by a direction followed by the orbit over said predetermined areas, and defining the plurality of the corridor reference geometric fragments based on the reference path.

According to embodiments, the reference path is an illuminated orbit path.

According to embodiments, the additional geometric fragment and the reference geometric pattern have the respective bordering edges at a same border distance apart at every point along the respective bordering edges.

According to embodiments, the first distance is determined based on characteristics of the at least one vehicle and/or the at least one vehicle's at least one payload, wherein the characteristics preferably include at least one of an inclination of the at least one vehicle, an altitude of the at least one vehicle, a field of regard of a sensor on board the at least one vehicle, or a field of view of the sensor.

Further features and advantages, as well as the structure and operation of various embodiments are described in detail below, with reference to the accompanying drawings. It is noted that the invention is not limited to the specific embodiments described herein. Such embodiments are presented herein for illustrative purposes only. Additional embodiments will be apparent to persons skilled in the relevant art(s), based on the teachings contained herein.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIGS. 9A, 9B, 9C, and 9D illustrate various conditions of no gap or an area of overlap between (reference) geometric fragments. FIG. 9A illustrates no or minimum overlap for the longitudes along the latitude 0° of the equator. FIG. 9B illustrates a constant degree of overlap for the longitudes along the latitude 0° of the equator. FIG. 9C illustrates no or minimum degree of overlap for the longitudes along the latitude 0° of the equator and also for the longitudes from the latitudes from the equator (latitude 0°) to the poles (latitude 90° or −90°). FIG. 9D illustrates a constant degree of overlap for the longitudes along the latitude 0° of the equator and also for the longitudes from the latitudes from the equator (latitude 0°) to the poles (latitude 90° or −90°).

FIG. 10 is a flow diagram showing an example overview process for planning data collection over part or all the surface of the Earth using sensors onboard satellites according to embodiments of the present disclosure.

DETAILED DESCRIPTION OF EMBODIMENTS

Figure 1:
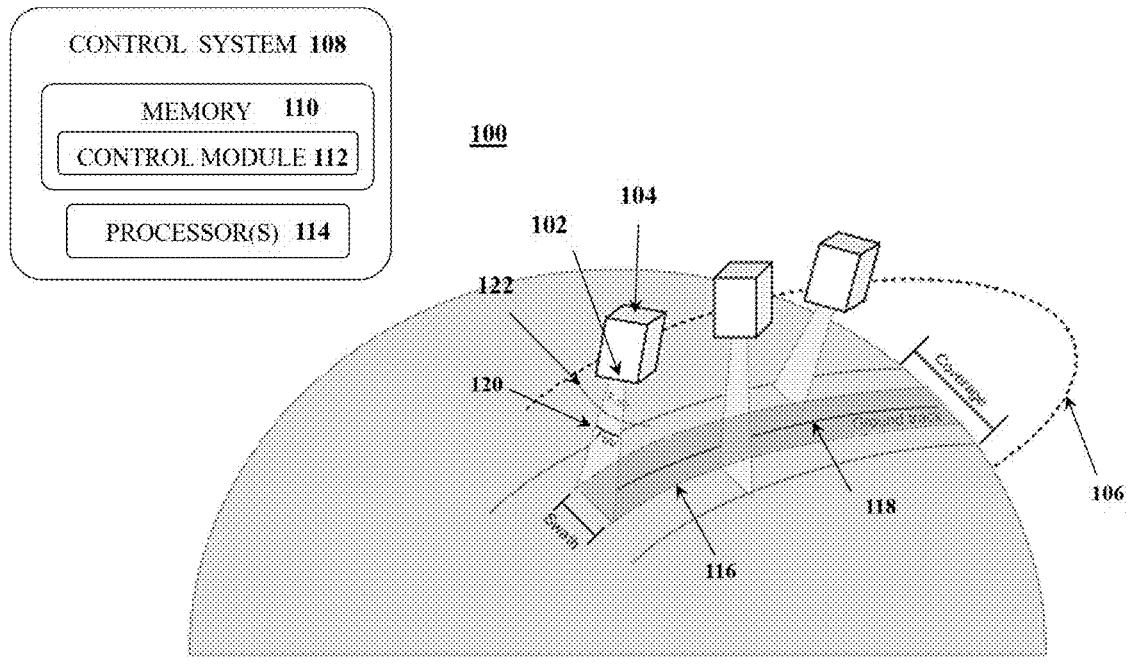
FIG. 1 shows an example of an Earth observation system according to embodiments of the present disclosure.

Embodiments include novel systems and methods designed to collect data from the surface or atmosphere of a celestial body with one or more vehicles equipped with sensors. In some instances, the vehicles are manned or unmanned aerial or space vehicles also referred to herein as "aircrafts" or "spacecrafts", such as Earth observation artificial satellites. The systems and methods allow to determine a plan for data collection based on geometric ground patterns designed to efficiently acquire data from remote locations covering all or part of the surface or atmosphere of the celestial body.

For simplicity of description, the following examples mainly refer to methods and systems to optimize the capture of imagery data from the surface of the Earth with a satellite or a constellation comprising satellites (artificial satellites), however it is not intended to limit the scope of the claimed subject matter since other types of data that may be collected by sensors on board manned or unmanned aerial or space vehicles such as radiofrequency (RF) data or gas or substance detection data, other types of celestial bodies such as the Moon or a planet, and any manned or unmanned space vehicle such as spaceships are also included within the scope of the subject matter described herein.

In some implementations, methods and systems are described for determining geometric ground patterns for proper coverage of areas that a satellite or satellites of a constellation may use for data collection over the areas, controlling data redundancies. The geometric ground patterns may define geometric fragments covering areas over the celestial body, such that the satellite(s) are able, following their orbit, to collect data covered by the geometric fragments. In some instances, the geometric ground patterns may be determined dynamically based on previous data collections or heatmaps, as explained elsewhere within the Detail Description.

In some implementations, by increasing the efficiency of the data collection, the systems and methods described herein may plan the data collection based on the relevance of a target, so that data about the target may be collected at predetermined time frequencies such as hourly, daily, monthly, weekly or any predetermined period of time. This is useful for example when there is a point of interest within a region on or over the Earth, such as a volcano eruption, and the aim is to revisit that point hourly or daily to collect data such as images or gas emission.

In other additional or alternative implementations, the systems and methods described herein allow to map and/or remap the surface of the Earth at predetermined frequencies reducing the technical demands of the system collecting data due to the higher efficiency in the data collection. For example, by optimizing the data collection it is possible to use low cost satellites with limited resources that can provide information about, for example, volcanoes, over the surface of the Earth, monitoring its activity daily or weekly.

By operating in the manner described throughout the Detailed Description, the planning problem may be clearly separated in two phases, that is solving the orbital/geometric problem of determining what fragments may be captured by each satellite in each orbit in a given time span, and solving the combinatorial problem of deciding what fragments are to be captured in each orbit by each satellite of the fleet.

The processes, systems, and devices described herein may be implemented in a number of ways. Example implementations are provided below with reference to the following figures to aid in illustration, although those examples are not meant to be taken in a limiting sense.

Example Earth Observation System

FIG. 1 illustrates an example Earth observation system 100 comprising one or more sensors 102 which may be part of a payload on-board a vehicle following a trajectory, such as a satellite 104 orbiting (following an orbit) around the Earth. As used herein, the term sensors is a broad term and refers to any sensors on board the satellite that generate data, and may include image sensors, instruments for Earth observation, sensors from available payloads, temperature sensors (e.g., thermal imaging sensors, or infrared sensors), sun sensors, earth sensors, power meters, attitude sensors, and the like. The data may be imagery data, but may also or alternatively include other types of data such as RF data, gas or substance detection, or any other data that can be retrieved from a celestial body, its surface or atmosphere. The satellite 104 may follow or be operated on and along a closed orbit. The closed orbit may be an elliptical orbit, or a circular orbit when the foci of the ellipse coincide. For example, the satellite 104 may follow or be operated on and along an orbit 106, such as a polar orbit or nearly polar orbit around the Earth. In some instances, the satellite 104 may follow a sun-synchronous orbit (SSO) around the Earth allowing the observation of a region of the Earth at the same local time, so that the same region (area or volume) is observed with similar solar radiation conditions after a number of revolutions around the Earth in a given number of days. For example, the sun-synchronous orbit of a satellite is chosen so that the same area of a city is observed every day at the same local time. Alternatively, the satellite 104 may follow or be operated on and along a Molniya orbit, to target the acquisition of data over high latitudes.

In some instances, the Earth observation system 100 may comprise a constellation of satellites equipped with similar or different sensors orbiting around the Earth from which data may be collected. Generally, the satellites forming the constellation may orbit in different sun-synchronous orbital planes having the same or similar altitudes and the same or similar inclinations. Similar should be interpreted as differing within a certain range. For example, the constellation may comprise Low Earth Orbit (LEO) satellites orbiting at altitudes of less than 1000 km above the Earth's surface hence the altitudes of the orbits can range typically between 150 to 800 km. Generally, the different the inclinations are, the harder it would be to build a geometric ground pattern that can be captured by all the satellites of the constellation, especially in a more efficient way in which a larger part of the fragments are more or less aligned with the orbit path. When the satellites are equipped with optical instruments, it is preferable that the orbits are SSO (sun synchronous), so that the illuminated part of the orbit has a ground track with similar angles. Alternatively, when the satellites are equipped with synthetic aperture radar (SAR) instruments the orbits may be other than SSO orbits (for example 53 deg orbits) since with SAR instruments, the acquisition of data may be done irrespective of whether or not there is sun light, and may acquire data over fragments during the ascendant as well and the descendant parts of the orbits. The orbital planes may be defined in relation to the Earth's orbital plane for Earth observation, but other reference orbital planes may be defined for observing other celestial bodies. The satellites of the constellation may orbit all following circular orbits, but in some implementations, some satellites may orbit following circular orbits and some following elliptical orbits, or all following elliptical orbits.

Earth observation system 100 may further comprise a control system 108 which may be all or partially on-board satellite 104 or on the ground. In some embodiments, some of the components of the control system may be ground-based or on-board a separate satellite if the system comprises a constellation of satellites, with such ground-based or separate satellite in communication with the control system. In some instances, the control system is configured as any suitable computing device or system.

The control system 108 includes a memory 110 and at least one control module 112. Memory 110 may store program instructions and program modules that are loadable and executable on one or more processors 114, as well as data generated during execution of, and/or usable in conjunction with these programs, such as image data, images, substance detection, RF data, and so forth. The control module 112 may perform some or all of the control functions associated with processing the data or planning the data acquisition in accordance with embodiments of the present disclosure. The control module 112 is executable by the one or more processors 114 to control, such as through one or more input/output interfaces, the sensor operations, the data transmission, as well as other functions associated with the data processing and acquisition processes. It should be appreciated that additional modules may be present for other purposes, and that several modules may be present for one or many of the purposes described.

The control module 112 may further include firmware (stored on a suitable, non-transitory computer-readable storage medium) to perform or otherwise control various functions of the Earth observation system 100. The firmware may be executable by the one or more processors 114 to control the system, to process data, to store data on the memory 110, to transmit data or instructions to other satellites of the constellation, and so forth. In embodiments, some or all of the functions of the control module 112 and/or other functions of the firmware may be implemented as logic functions on the one or more processors 114. For example, in some embodiments, the one or more processors 114 may include a central processing units (CPU), a graphics processing units (GPU), an application-specific integrated circuit (ASIC), a programmable logic device, such as a field programmable gate array (FPGA), a digital signal processor (DSP), a tensor processing units (TPU), any combination of these, or any other logic circuit to perform various functions, including various control functions of the control module 112. The one or more processors 114 are processors dedicated to the control system 108, but in many instances may be the same processors that control the satellite 104. Generally, the memory, the processors and/or the modules stored in the memory of the control system 108 may be shared between a plurality of satellites in a satellite constellation, or between the satellites and the ground. As used herein, the term "a plurality" refers to more than one countable entity.

Depending on the configuration and type of computing device used, memory 110 of the control system 108, may include volatile memory (such as random access memory (RAM)) and/or non-volatile memory (such as read-only memory (ROM), flash memory, etc.). Memory 110 may also include additional removable storage and/or non-removable storage including, but not limited to, flash memory, magnetic storage and/or optical storage, and/or tape storage that may provide non-volatile storage of computer-readable instructions, data structures, program modules, and other data for the Earth observation system 100. Memory 110 is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Determining the proper coverage of the areas is essential for remote sensing missions, yet depending on the payloads swath width and the size and variety of the spacecraft constellation, this can be a very complex problem to solve. In order to optimize the collection of data for example for mapping or remapping the world or large areas with the fleet of satellites, the control module 112 may, on one hand, solve the orbital/geometric problem of determining what fragments may be captured by each satellite in each orbit in a given time span, and on the other hand, may solve the combinatorial problem of deciding what fragments are to be captured in each orbit by each satellite of the fleet.

In order to solve the orbital/geometric problem, the control module 112 is primarily responsible for determining a geometric ground pattern. The geometric ground pattern may be determined based on at least one orbit path stripe 116. As used herein, an orbit path 118 or sometimes referred to as ground track, refers to the projection over the ground (e.g. surface of the Earth) of the satellite orbit 106; an illuminated orbit path refers to the portion of the orbit path that is illuminated; and an orbit path stripe 116 is the stripe generated with an illuminated orbit path considering the field of view (FoV) 120 of the sensor 102 on board the satellite 104, looking at nadir.

The geometric ground pattern is an arrangement of geometric fragments. A geometric fragment, denoted as F, is a construction associated with a path (that is a sequence of points) on the Earth, denoted as p, and for a given path, F(p) is the fragment associated with p, which may be built to resemble the minimum covered footprint of the sensor (e.g. an optical instrument) if any of the satellites of the fleet is capturing that point at nadir. In some implementations, it is possible to estimate the payload footprint when the satellite is looking at a point on the Earth by using the width of the swath of the payload at nadir. In some instances, the estimated footprint may also include an off-nadir angle to increase the field of view, for example, the estimated footprint may be the size of the width of the swath of the payload at nadir plus an additional 20% if a minimum off nadir angle is used, provided that the size including the addition is within the Field of Regard (FoR), that is the total angle that a satellite or sensor may swing.

In some implementations, the control module 112 may build geometric fragments that simulate the projection of a line, area or volume over the ground or surface of the Earth, or that simulate the shape of orbit path stripe 116, but may not necessarily be the projection of the actual satellite orbit 106. The geometric fragments may emulate the orbit shape very accurately, since the more the geometry of the geometric fragment diverges from the orbit path stripe 116 of the satellite, the harder it would be to capture that geometry with the satellite's instrument (payload, sensor) given the geometric and orbit constraints. Generally, the geometric fragments may be within the field of regard (FoR) 122 of the sensor or sensors on-board the satellite when following its orbit. The geometric fragments may have a longitudinal or long shape with a side longer than its width. In some instances, the control module 112 may generate geometric fragments based on the satellite's altitude and inclination, and/or on the characteristics of the sensors on-board the satellite. For example, for imaging sensors the characteristics of the sensors may include the swath defined as the width of the area captured by a particular sensor which generally depends on the field of view (FoV) of that particular sensor. The FoV is usually fixed by design but changing the altitude can increase or decrease the swath. In some instances, the geometric fragments may be generated based on the FoV of the sensor on-board the satellite looking at nadir or the swath.

In some implementations, the control module 112 may generate the geometric fragments of a geometric ground pattern based on general aspects of the satellite's orbits and sensors (i.e. instruments). For example, the control module 112 may generate at least one reference geometric fragment so that the reference geometric fragment corresponds to an orbit path stripe, and may generate a sequence of geometric fragments based on the at least one reference geometric fragment to form the geometric ground pattern. In some implementations, the reference geometric fragment may be generated based on an illuminated orbit path referred to herein as reference path. For example, a reference path (op) may be determined as a line string of latitude and longitude coordinates, such that op:=$\{(lat_i, long_i)\}_{i=1,\ldots,N}$, where i is an integer number between 1 and N, using at least one satellite of the fleet and the propagated orbit in any particular time, and the reference geometric fragment may be denoted as F(op).

The control module 112 may, based on the at least one reference geometric fragment, start building iteratively geometric fragments that are contiguous to each other. In some implementations, there is no overlap or a minimum overlap between contiguous geometric fragments at the latitude of the equator to guarantee coverage. The latitude of the equator is to be interpreted as a latitude corresponding to a plane perpendicular to the rotation axis of the celestial body that passes through the center of the celestial body. The control module 112 may generate the geometric fragments by shifting a newly added geometric fragment a predetermined distance measured along the equator's latitude, each newly added geometric fragment being adjacent to the previously added geometric fragment, starting from the reference geometric fragment, to obtain a sequence of geometric fragments that, in some implementations do not overlap in the line of the equator. The predetermined distance may be fixed or constant in the cross-track direction and may vary in longitude (though it is close to that for most of the orbit). The predetermined distance may correspond to the width of the reference geometric fragment or the width of the orbit path stripe. For example, a minimum shift in longitude (lshift) may be computed so that when the reference path is shifted the associated path stripes are disjoint at the equator. By denoting a line l that may be a sequence of latitude and longitude points in WGS 84 coordinate system, and a point pt, and l+pt the resulting line of summing pt to all points of the line l, the minimum shift may be described as $lshift:=min\{ls:F(op) \cap F(op+(0, \ ls)) \cap equator\_line=\varnothing\}$, where ls is the longitude shift and equator_line is the line over the equator. In some instances, the extent of the longitude shift may be equivalent to the instrument swath width at nadir at the equator.

Figure 2:
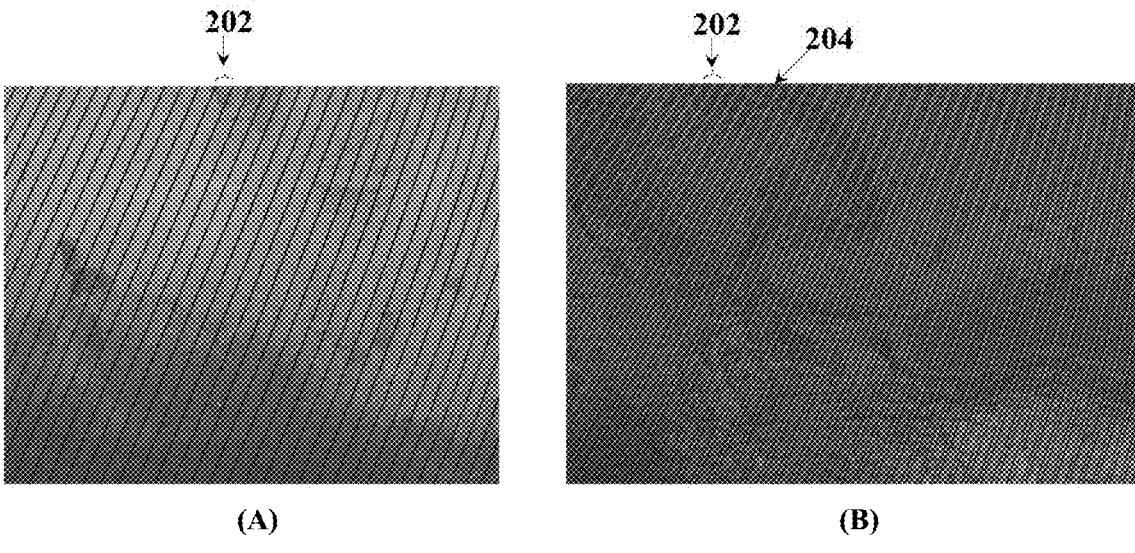
FIG. 2 illustrates an example of the geometric ground pattern showing the arrangement of the geometric fragments for a swath of 100 km (A) along the line of the equator, and (B) at higher latitudes.

The control module 112 may add geometric fragments iteratively to form the geometric ground pattern until all the areas to be mapped or remapped are covered. For example, for a fleet orbiting in quasi-polar (near polar) orbits, the control module 112 may apply a maximum number of shifts N, that if applied subsequently, will end up giving a complete turn around the Earth along the line of the equator, covering the whole surface of the Earth. The geometric ground pattern may be defined as the following arrangement of geometric fragments $\{F(p)\}_{p \in P}$, where $P:=\{op_0+(0, i \cdot lshift)\}_{i=1, \ldots, N}$, where $op_0$ is a given illuminated orbit path used as reference. FIG. 2 illustrates an example of the geometric ground pattern 200 showing the arrangement of the geometric fragments 202 for a swath of 100 km (A) along the line of the equator, and (B) at higher latitudes. The geometric ground pattern of FIG. 2 optimizes the amount of geometric fragments that are in the range of the off nadir for a given orbit. However, the geometric fragments, and hence the captures, slowly increase their overlapping near the poles. A geometric ground pattern built by shifting the geometric fragments adjacently and contiguously along the line of the equator will inevitably lead to an overlap 204 of the geometric fragments closer to the poles as seen in FIG. 2 (B) as darker stripes. Hence, the geometric fragments of a geometric ground pattern built as described above will gradually increase their overlapping near the poles, so that the degree of overlap increases as the latitude increases. After solving the orbital/geometric problem by building a geometric ground pattern as described above, the control module 112 may use the geometric ground pattern to solve the planning problem by selecting which geometric fragments to capture in each orbit by each satellite of the fleet and, given that the degree of overlap increases as the latitude increases, the control module 112 may, in some implementations, task the satellites to switch on the payload for capturing data when the system detects that the degree of overlap is below than a predetermined threshold and to switch off the payload when the degree of overlap is higher than the predetermined threshold towards the poles.

Even though the above example illustrates the situation in which there is no overlap along the line of the equator to build the geometric ground pattern, it should be understood that other degrees of overlap are also included within the scope of present disclosure. The control module 112 may control the degree of overlap of the geometric fragments while building the geometric ground pattern as explained throughout the Detailed Description. Generally, it may be desirable to control the overlap to reduce the overlapping of the geometric fragments, but without reducing the data collection opportunities over them for a given orbit.

In order to reduce the gradually increasing degree of overlap towards the poles, the control module 112 may design a geometric ground pattern comprising a plurality of geometric fragments built based on corridor reference geometric fragments. The corridor reference geometric fragments are geometric fragments generated based on illuminated orbit paths (i.e. reference paths), similarly to the geometric reference fragments of FIG. 2. In order to build the geometric ground pattern, the control module 112 may select a subset of geometric fragments generated based on reference paths (i.e. corridor reference geometric fragments), each generated similarly to the geometric reference fragment of FIG. 2, wherein the geometric fragments from the subset are separated by a predetermined distance. In some instances the predetermined distance may be fixed. For example, the control module 112 may select a subset of geometric fragments from the geometric ground pattern as defined above, i.e. $\{F(p)\}_{p \in P}$, where $P:=\{op_0+(0, i \cdot lshift)\}_{i=1, \ldots, N}$, wherein the selected geometric fragments, referred to as corridor reference geometric fragments or center of corridors, are separated a distance K, where K is the number of geometric fragments that can fit inside the Field of Regard all along the orbit. This subset of fragments can then be formally described as $\{F(p)\}_{p \in PL}$ where $PL:=\{op_0+(0, i \cdot K \cdot lshift)\}_{i=1, \ldots, N/K}$, and $op_0$ is a given illuminated orbit path used as reference.

The distance between corridor reference geometric fragments may be determined based on the satellite and payloads configuration, including its altitude and inclination, and/or on the Field of Regard (FoR) and Field of View (FoV) of the sensor on-board the satellite; the FoR being the maximum across track off nadir angle at which the distance to the targets does not affect the quality of the data acquisitions, which usually has an impact on the resolution (formally speaking, in the Ground Sample Distance (GSD)), and the FoV being the angle that defines the instrument footprint. With the orbit height and the FOV, the swath at nadir can be computed. It is typically an instrument's characteristic.

In order to have more control over the overlap between geometric fragments, in addition to generating the geometric fragments by shifting in latitude the geometric fragments projected in WGS-84 to produced no or minimum overlap along the line of the equator, the added geometric fragments can also be generated based on real distances measured in kilometers at other latitudes. For example, for each corridor reference geometric fragment, the control module 112 may build geometric fragments by iteratively adding contiguous or adjacent geometric fragments but with no overlapping all along the width and length of the geometric fragment, that is, contiguous pseudo-parallel geometric fragments that do not cross each other all along the length of the geometric fragment, including near the poles. The terms contiguous or adjacent are to be interpreted as being next to each other with no gap and no area of overlap, or having a certain area of overlap from the edge of not more than a threshold level of overlap. The certain area of overlap may be a uniform area of overlap and, in some instances, may be measured as a linear distance (e.g. km) and is generally an overlap that takes into account sensor pointing errors, degree of overlap between acquired images for posterior stitching, and so forth. The term pseudo-parallel is used herein in the sense that the adjacent edges of two geometric fragments are at the same distance apart at every point along their length. By determining the geometric ground pattern in this manner, the geometric fragments iteratively added may be more separated towards the poles than would be equivalent adjacent orbit path stripes projected from real orbits which have no or minimum overlap along the line of the equator. In other words, the iteratively added geometric fragments are not following any orbit path, and on each addition, the geometric fragments are more separated at the poles than at the equator compared with the corresponding geometric fragment of a geometric ground pattern built using a reference geometric pattern and added geometric fragments contemplating basically having a longitude shift without overlapping along the line of the equator, as described elsewhere within the Detailed Description.

At some point, the geometric fragments from different corridors start crossing each other. A corridor comprises a corridor reference geometric fragment and the pseudo-parallel geometric fragments iteratively added adjacent to the corridor reference geometric fragment. Given that the geometric fragments within a corridor have no overlap or a controlled overlap (i.e. an overlap of not more than a threshold level of overlap) along its extension including at high latitudes, the geometric fragments of different corridors start overlapping considerably precisely at the poles. In order to reduce or minimize the overlap of geometric fragments which may duplicate the data that can be collected, the control module 112 may cut out a portion of a geometric fragment that is not contributing to the coverage because it provides duplicate data that is already covered by another geometric fragment. The control module 112 may continue adding geometric fragments iteratively, cutting out the geometric fragments of different corridors that start overlapping with an overlap of above a threshold level of overlap, until there is no more area or volume of interest to cover, or until the geometric fragments from different corridors start crossing each other at the line of the equator.

The control module 112 may execute programming instructions to perform acts for the construction of geometric ground patterns as described throughout the Detailed Description. The programming instructions may be stored in memory and may be executable by one or more processors to perform acts including determining one or more corridor reference geometric fragments based at least in part on the propagation of a satellite orbit at a particular time. The number of corridor reference geometric fragments may be determined by a predetermined distance of separation between the corridor reference geometric fragments and the number of shifts to cover an area of interest. For example, if N is the number of shifts necessary to turn around the globe along the line of the equator to cover the whole surface of the Earth, and K is the predetermined distance between the corridor reference geometric fragments, the number of corridor reference geometric fragments is N/K and the corridor reference geometric fragments RF may be built as line strings of latitude and longitude coordinates such that $RE \leftarrow \{op_0 + (0, i \cdot K \cdot/s)\}_{i=1, \ldots, N/K}$, where $op_0$ is an illuminated path orbit used as the seminal geometry to build the fragmentation, the letter i is an integer number between 1 and N/K, and ls is the longitude shift as defined elsewhere within the Detailed Description.

Figure 3:
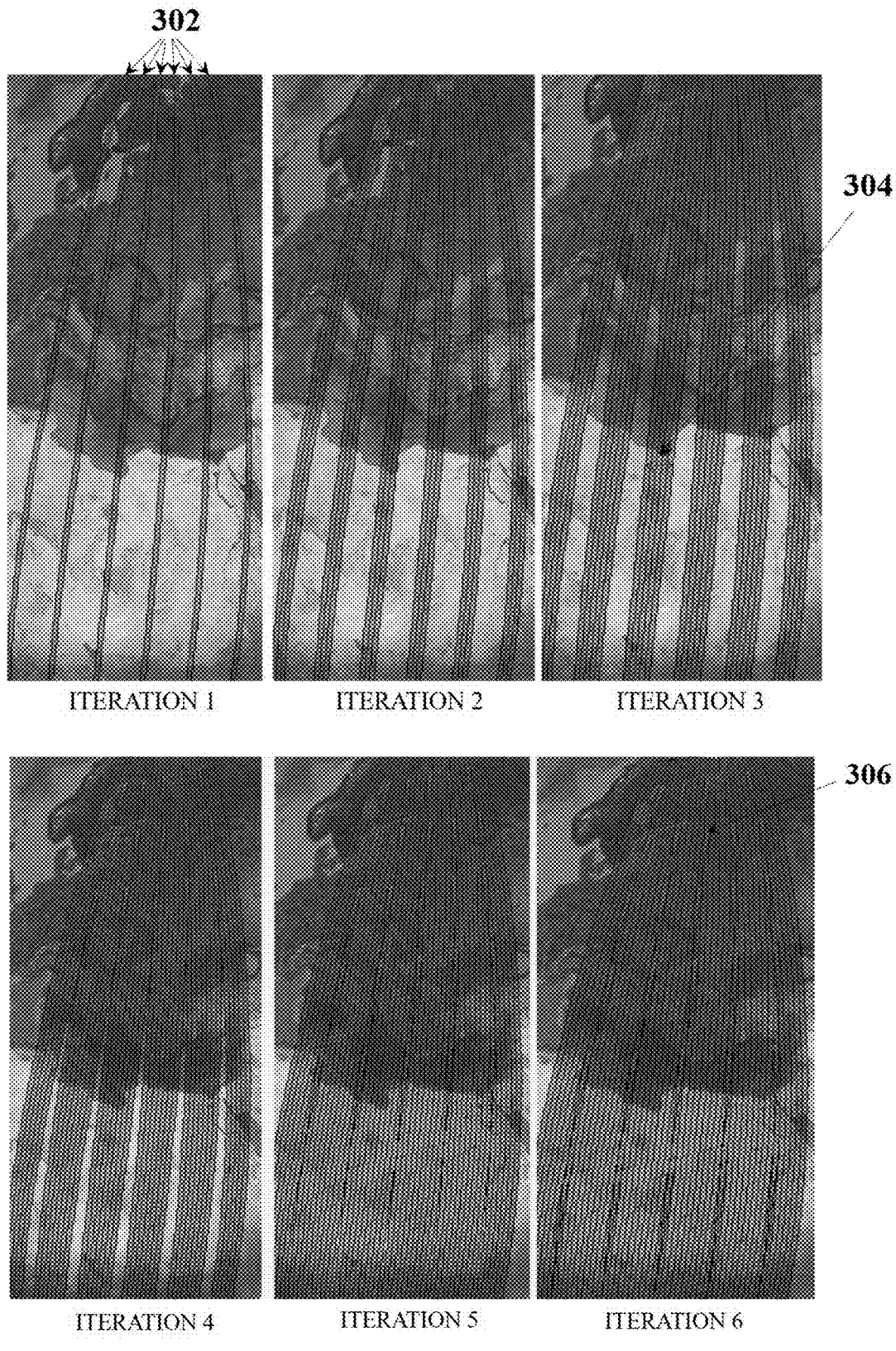
FIG. 3 illustrates the resulting geometric fragments generated by performing six iterations of a while loop written in pseudocode as described in the example of programming instructions according to embodiments of the present disclosure.

The acts may further comprise iteratively adding contiguous or adjacent geometric fragments but with no or minimum overlap all along the width and length of the geometric fragment. In some implementations, the geometric fragments may be added to either side of each of the corridor reference geometric fragments so that the added geometric fragments are shifted a distance based on the sensor's swath width. For example, a swath_shift function may be defined so that given a line of points is able to shift all its points a distance equal to the swath width in the direction perpendicular to the line, and projecting the line to the earth i.e swath_shift$^+$(path):=$[p_i + sw \cdot \eta_i : p_i \in path]$, where $\eta_i$ denotes the normalized perpendicular direction of the path path at the point $p_i$, and sw is the swath width. A skilled person in the art would understand that the points of the path are in a proper coordinate system to allow these computations, and are also projected over the surface of the Earth. Likewise, a similar function swath_shift$^-$(path) may be defined to shift the points in the opposite direction, that is, following the $-\eta_i$ direction. In the same manner, it is possible to apply this function to fragments, i.e. to build the geometric fragments, by shifting the center path of the corridor reference geometric fragment, for example, if F is the function that can build a fragment with a swath width from its center line, then swath_shift$^{(sign)}$ (fragment):=$F \circ$swath_shift$^{(sign)} \circ F^{-1}$ (fragment). Based on these definitions, the example below shows programming instructions that may be used for generating the geometric fragments to build a geometric ground pattern according to embodiments of the present disclosure, having as input one reference orbit path op and the longitude shift is as defined elsewhere within the Detailed Description. FIG. 3 illustrates the resulting geometric fragments generated by performing six iterations of the acts described in the programming instructions below.

```
Input: op, ls, K
Output: F
  RF ← {F(op + (0, i · K · ls))}_{i=1,...,N/K}
  ToExpand⁺ ← list( RF )
  ToExpand⁻ ← list( RF )
  Coverage ← ∪RF
  F ← RF
  while ToExpand⁺ ≠ ∅ or ToExpand⁻ ≠ ∅ do
    for sign ∈ [+, −] do
      f ← ToExpand^(sign) .pop(0)
      shifted_f ← swath_shift^(sign) (f)
      if shifted_f − Coverage ≠ ∅ then
        reduced_f ← shifted_f − Coverage
        F.add(reduced_f)
        Coverage ← Coverage ∪ shifted_f
        ToExpand^(sign) .append(shifted_f)
      end if
    end for
  end while
  return F
```

Figure 4:
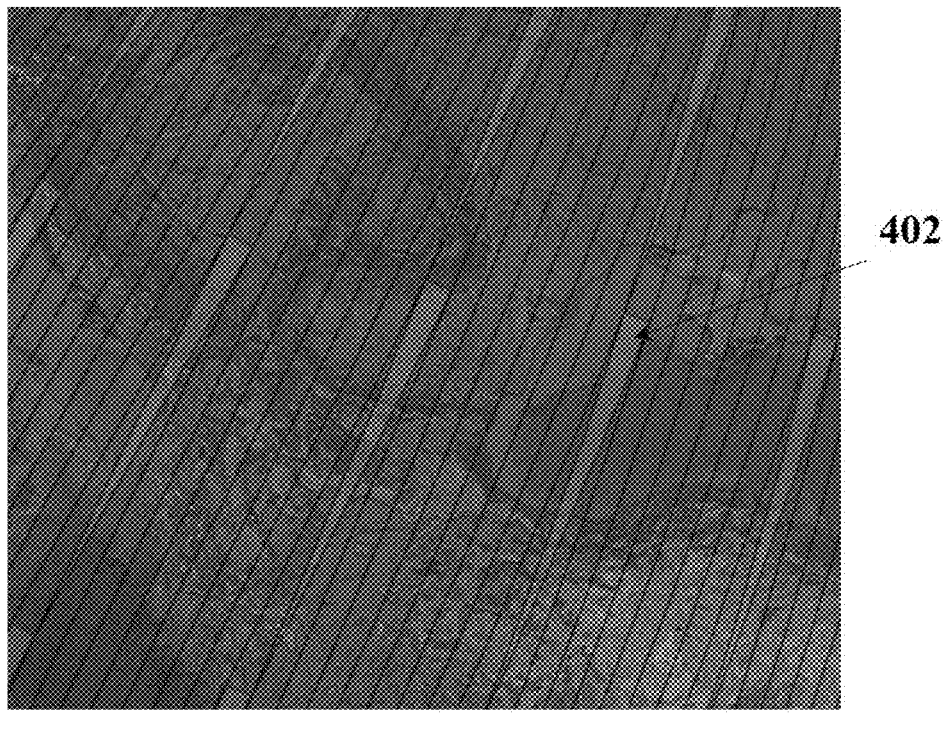
FIG. 4 shows a closer view of the geometric ground pattern generated using the programming instructions according to embodiments of the present disclosure.

FIG. 3 shows corridor reference geometric fragments 302, corridor 304 and overlapping portions 306 (triangular lighter zones) where the fragments of adjacent corridors intersect. FIG. 4 shows a closer view of the resulting geometric ground pattern comprising numerous geometric fragments over a portion of the surface of the Earth with overlapping portions 402. By operating in this manner, the geometric ground pattern comprises geometric fragments having portions with minimum or no overlap along the equator and portions with a predetermined degree of overlap toward the poles. In an example, the predetermined degree of overlap along the whole overlapping or contacting area between geometric fragments may be less than a predetermined threshold level of overlap. In the portion of the geometric ground pattern of FIG. 4 it can be seen how the amount of overlapping portions 402 at higher latitudes (marked in a lighter tone) is reduced as compared to the geometric ground pattern shown on FIG. 2B, in which the overlapping portions 204 (marked in a darker tone) occupy a much larger area, and hence the overall amount of redundant data is potentially much higher. In some instances, it is desirable to determine the threshold level of overlap taking into account the importance of the geographical location lying below the geometric ground pattern, since the threshold level of overlap may be changed to avoid cutting out geometric fragments when these lie over important targets such as big cities. In some cases, the extension of the overlapping zones may also be determined based on the targets.

The control system may use other programming instructions to build geometric ground patterns. The geometric ground pattern may include geometric fragments of uniform shapes and/or sizes, whereas in some instances the geometric ground pattern may include geometric fragments of non-uniform shapes and/or sizes, for example to adjust the geometric fragments to geographical locations of interest. In some implementations, geometric fragments of non-uniform shape and/or size may be defined for example by a finite element method (FEM), so that the control system may be configured to subdivide a large area into smaller and simpler portions that are called finite elements to build the geometric ground pattern.

One of the advantages of building geometric ground patterns to then decide what fragments may be captured, is the possibility of controlling the data redundancy by controlling the degree of overlap of the geometric fragments forming the geometric ground patterns. This is useful to obtain a more efficient coverage of the surface of a planet and collection of data, for example reducing redundant data over areas of less importance, or increasing the redundant data in areas which are important or difficult to gather. In some instances, designing regions on the geometric ground pattern with overlapping zones gives more possibilities of capturing relevant data. For example, the satellites may capture data over the overlapping zones of a geometric ground pattern and, given that the overlapping zones on the geometric pattern are related to an increase in the satellite's capture opportunities over an area, the satellite may delay the decision of whether to download the redundant collected data until a predetermined condition is satisfied, such as the quality of the data, the cloud content of an image, and so forth.

For any of the geometric ground patterns described throughout the Detailed Description, the control module 112 may control the overlap between the geometric fragments, and may, additionally or alternatively, dynamically associate overlapping zones, having a degree of overlap, with areas or points on the surface of the Earth. Alternatively or additionally, the control module 112 may determine a resilience factor representing a degree of additional or extra coverage provided by the geometric ground pattern generally in the form of overlapping zones, which may include a planning prioritization scheme for the recapturing of the geometric fragments. The resilience factor may be used for determining at least one of the degree of overlap, the area of overlap and/or threshold level of overlap between geometric fragments, for example between parallel and adjacent geometric fragments or between the geometric fragments of corridors that start overlapping usually at higher latitudes. For example, a satellite may determine a resilience factor so that the overall degree or level of overlap of the geometric ground pattern has a statistical percentage of between about 10-20%, which may be different for different areas.

The degree of overlap may be distributed uniformly between the geometric fragments or may be distributed non-uniformly. For example, in the case of geometric fragments having the shape of stripes, the geometric fragments may have areas that overlap along the parallel and adjacent direction with a lower level of overlap than the areas that overlap at higher latitudes when the corridors start overlapping. In some instances, the degree of overlap between the geometric fragments may be distributed throughout the geometric ground pattern or associated with areas or points on the surface of the Earth based on a heatmap which includes information of the geographical areas of most interest to clients, applications, tasks, aging, and/or number of tasks to be performed by the satellite. For example, a geometric ground pattern having a resilience factor representing a statistical percentage of overlap of about 30% may have geometric fragments with areas that overlap about 10% corresponding to geographical areas (e.g. countries, cities) tagged or marked as having a low value or measure of importance, significance, or usefulness, and areas that overlap about 20% corresponding to geographical areas tagged or marked as having a high value or measure of importance, significance, or usefulness. In some instances, the degree of overlap on areas corresponding to geographical areas tagged or marked as having a high value or measure of importance, significance, or usefulness may vary within a range. For example, the degree of overlap may be between about 11-30% so that the areas having increasing importance may be differentiated between them. Alternatively or additionally, the variation throughout the range of 11-30% may be linked with a corresponding range of values or measures of importance, significance, or usefulness determined, for instance, based on the number or priority of client requests.

Alternatively or additionally, the resilience factor may be used by the satellite to plan the data acquisition. For example, a satellite may use the resilience factor to increase the data collection opportunities in particular areas or points of interest by associating the overlapping zones and/or the degree of overlap of the geometric ground pattern with geographical areas or points of interest. The satellite may perform the association based on analysis results received from the ground or from another satellite, or based on analysis results obtained on-board the satellite. The analysis results may depend, among other factors, on the type of collected data (e.g. image data, RF signals, sensor data), on meta-data (e.g. telemetry, the position of the vehicle or satellite system, and/or a health of the vehicle or satellite system or its subsystems), on information related to the content of the data (e.g. results of image content-based analysis), and so forth. The resilience factor may be dynamically determined by the satellite and may be used to increase the data collection opportunities in particular areas or points of interest. In some instances, the satellite may, based on the resilience factor of the geometric ground pattern, plan the data collection. Additionally or alternatively, the satellite may plan the data collection based, at least in part, on at least one of the constellation resources (e.g. number and/or characteristics of the satellites in a constellation), predetermined areas on the surface of the Earth, or data characteristics (e.g. object or features of interest like cars, cities or lakes;

obstructions like clouds or dust). For example, if during a satellite pass that can capture at least partially a certain geometric fragment, it is detected that there are clouds, said capture may not be taken, and maybe another area is captured that is capturable by the satellite in said pass. For another example, if during a satellite pass that can capture at least partially a certain geometric fragment, it is detected that there were no clouds in a previous capture, it may be determined that it is no longer necessary to capture again, and the capture may not be taken. For another example, in areas in which it is expected that a satellite imaging device may malfunction, it is possible that captures are not taken in certain passes over said areas. In such cases, having a resilience factor that can be increased for said certain areas where it is expected that for whatever reason it might be needed to have more redundancy in the capture opportunity, may also contribute to the plan of the acquisition. The resilience factor may be used by the satellite or by a constellation of satellites to plan the data acquisition, for example in determining the geometric fragments over which the satellite(s) may collect data, in determining which geometric fragments are assigned to each satellite of a constellation of satellites or in determining what fragments are to be captured in each orbit by each satellite of the constellation, since the data redundancy provided by the resilience factor in the form of overlapping zones and/or degrees of overlap of the geometric fragments may increase the data collection opportunities of the satellite(s).

There are several advantages associated with determining a resilience factor. By adding a resilience factor to the geometric ground pattern, a predetermined degree of overlap is included, as well as the possibility of dynamically associating the degree of overlap with areas or points over the surface of the Earth, which are useful when deciding what fragments may be captured in each orbit by each satellite of the fleet, providing a robust fleet. For example, the data may still be collected despite a failure in the reliability or availability of any of the satellites of a constellation over time, obstructed views such as when the surface of the Earth is covered by clouds, or unforeseen demands such as when the number of users or clients distributed over the world increases the demand of satellite resources for tasking image captures of targets instead of for collecting data for Earth coverage. This also allows to optimize the fleet's resources, for example, by reducing the load in older satellites that may present battery degradation, while taking advantage of newer satellites with more power capacity.

In order to solve the combinatorial problem of deciding what geometric fragments will be captured in each orbit by each satellite of the fleet (also referred to as the planning problem), the control module 112 may select at least one geometric ground pattern and may direct the sensors on-board the satellite to collect data based on the geometric ground pattern and the configuration of the satellite (e.g. altitude, inclination, type of orbit). The control module 112 may direct the sensors to collect data (e.g capture images) over one or more geometric fragments of the geometric ground pattern. The control module 112 may assign one or more geometric fragments from a plurality of geometric fragments forming the geometric ground pattern to a satellite, and may direct the sensors on-board the satellite to collect data within the assigned one or more geometric fragments. For example, to cover a large area of the world, the control module 112 may determine which geometric fragments intersect with the area to cover, and may direct the sensor to collect data over the determined geometric fragments. Due to the manner in which the geometric ground pattern is designed, any target within the geometric fragments of the geometric ground pattern may be potentially captured by the satellite, in other words, any point in the Earth that is covered by the geometric ground pattern may be accessed or revisited by the satellite.

Regarding the planning problem, the fact that the geometric fragments are a discrete set allows to separate the geographical/geometric problem of building a geometric ground pattern from the combinatorial problem of choosing which satellites capture which geometric fragments and when. The geometric ground pattern may be configured so that the overlap of geometric fragments is reduced, without reducing the opportunities of data collection for a satellite revolving the Earth at a given orbit. Alternatively, the geometric ground pattern may be configured so that the overlap of geometric fragments is increased to extend the areas for data collection. Furthermore, the geometric ground pattern may be dynamically reconfigured to optimize the data collection opportunities. One or more geometric fragments of the geometric ground pattern may be similar to the orbit path stripes of the satellite, so that if the orbit path of the satellite in a particular orbit crosses the middle of one of these geometric fragments, given that the orbit path stripe is similar to the one or more geometric fragments, the sensor of the satellite may collect data without reducing the opportunity data collection. In order to address the planning problem, the control module 112 may generate the capture opportunities for the fleet, that is, for an orbit of a satellite of the fleet, the control module 112 may compute what geometric fragments may be captured by the satellite within the maximum off-nadir range of its sensor.

Based on a geometric ground pattern, the control module 112, which may be a planner located on the ground or on-board the satellite, may assign at least one fragment to each satellite of a constellation of satellites, based at least in part on the satellite's orbit. Hence, the control module 112 may determine, taking into account the orbits of the satellites and the possible off-nadir maneuvers for data collection, one or more fragments that may be captured by each satellite. Ideally, this step is performed once since the orbit of the satellite is known and it generally does not change. However, a satellite may slightly change its orbit for different reasons, such as solar activity along its path or a maneuver performed by the satellite. Hence, in order to predict or determine with certainty when and where a satellite is going to pass while orbiting the Earth, it is necessary to first determine spatially and temporally where the satellite is. There are several ways of determining the satellite position, for example by using the information provided as a two-line element set (TLE) representing the position of a satellite in an orbit. Therefore, based on the satellite's position, the control module 112 may assign a fragment for each satellite, periodically, for example, once day, twice a day, depending on the update of the satellite's position information.

In previous approaches, the satellite received instructions, generally from a planner on the ground, indicating the attitude that the satellite had to follow in order to capture data (e.g. image data). The attitude was usually provided as angles specifying the degrees and direction that the satellite had to follow. In contrast, the original approach proposed herein, comprises instructions provided by the control module 112, wherein the instructions may be received from the ground or generated on-board the satellite, indicating one or more points on the surface of the Earth that the satellite has to point the sensors at to capture data. Then, the satellite knowing where it is and how to point at the indicated points on the surface of the Earth, may point and capture data. The innovative manner in which this is achieved is by providing instructions comprising a family of curve functions, wherein the curve functions provide, at predetermined instants in time, a point on the surface of the Earth that the satellite has to point the sensors at to capture data. Any family of curve functions may be used to fit the sequence of points on the surface of the Earth that the satellite has to point at, at different instants in time, such as polynomials, splines, or lines, trigonometric polynomials, wherein the parameters and the number of curve functions may be chosen based on a predetermined criteria. For example, the family of curve functions may comprise three polynomials, one for each x, y, z coordinate (cartesian coordinate system), which provides, at predetermined time intervals (e.g. every five seconds), at least one point on the surface of the Earth that the satellite has to point at. If the planning is performed on the ground and then sent to the satellite to be executed by the control module 112, the degree of the polynomials may be determined taking into account the amount of information that needs to be sent to the satellite. For example, the lower the degree of the polynomials, the lesser the number of coefficients that need to be sent to the satellite. Hence, the degree of the polynomial may be chosen as the minimum degree that describes the maneuver with an error negligible with respect to the pointing error. For example, the polynomials may have a degree of nine, and the planning may send ten coefficients describing the polynomial in x, ten coefficients describing the polynomial in y, and ten coefficients describing the polynomial in z. The coefficients allow to rescale the polynomial for each satellite and its orbit, so that for each instant in time the polynomials in x, y and z, are evaluated and provide the points on the Earth in ECEF coordinates where the satellite has to point at to collect data.

The curve functions may be built based on the geometric ground pattern. Given that the fragments of the geometric ground pattern are associated with points on the surface of the Earth, the points provided by the curve functions may correspond to the points of the center of a geometric fragment. For instance, the control module 112 may select points along the centerline of a longitudinal geometric fragment every 10 seconds (or every a predetermined distance e.g. 70 km, 90 km, 100 km), and then may determine three polynomials of degree nine, one in x, one in y and one in z, that better fit the imaginary curve connecting the selected points. Hence, at t=0 (t is time), the first calculated point on the surface of the Earth coincides with the beginning of the geometric fragment, at t=0.5 the calculated point coincides with the middle of the geometric fragment, and at t=1 the calculated point coincides with the end of the geometric fragment. It should be understood that geometric fragments may also refer to corridors, since the corridor is formed by a plurality of geometric fragments. In addition, the curve functions may be used for instructing the satellite to pass over points which, when fitted by the curve function, describe any shape or line other than the center lines of the geometric fragments of the geometric pattern. This is especially useful when the geometric fragments do not have uniform shape and/or size.

Once the geometric fragments over which the satellite has to collect data, which may be geometric fragments of a geometric ground pattern, are determined, and the control module 112, based at least in part on the satellite's orbit, assigns at least one geometric fragment to each satellite of a constellation of satellites, the control module 112 has to describe to the satellite over which geometric fragments the satellite has to collect data, at the orbit that the satellite is moving. Hence, the planning comprises assigning at least one geometric fragment to each satellite, and adjusting the curve function describing the geometric fragment to the satellite that is going to pass over the geometric fragment. For example, if the geometric fragments are described using three polynomials, one in x, one in y and one in z, the control module 112 has to modify the polynomials to adjust them to each of the satellites in order to instruct each of the satellites to point at a specific point at a specific time. In order to adjust the polynomials, the interval 0 to 1 is transferred to the time interval that it would take the satellite to travel from the beginning to the end of the fragment. This adjustment is necessary, since satellites orbiting at different altitudes have different velocities, consequently a first satellite orbiting at a higher altitude than a second satellite may pass along the fragment slower than the second satellite. Hence, the control module 112 takes into account the average speed at which the satellite is orbiting, which is determined at least in part by its altitude, and adjusts the polynomial, re-scaling it, so that it is adjusted to the average velocity of the satellite that is covering the fragment.

In general, the planner may assign at least one geometric fragment to a satellite, may determine when the satellite is going to pass over that geometric fragment, may determine the coefficients describing the curve function(s) for that satellite and geometric fragment, to describe the pointing trajectory that the satellite has to follow to collect data. The planner may also indicate a start time, that is the time at which time the satellite has to start collecting the data, and/or an end time, that is the time at which time the satellite has to finish collecting the data. In some instances, the satellite may calculate the start time. The time at which the satellite starts/finishes collecting data depends on the satellite's orbit and/or its orbiting speed. Hence, the instructions provided by the planner include the coefficients of the curve function(s) as well as the time at which the satellite has to start collecting data (start time) and/or to finish collecting data (end time), which may coincide with the beginning and end of the geometric fragment, respectively, or may coincide with a section of the geometric fragment. Then, if the control module of the satellite evaluates the curve function(s) for example twenty seconds after the start time, the satellite would have moved a distance equivalent to twenty seconds, and the curve function(s) would provide the x, y and z ECEF coordinates at which the satellite has to point at. Hence, the planner may also instruct the control module of the satellite to evaluate the curve function(s) at predetermined time intervals, so after evaluating the curve function(s) at those time intervals, the satellite has the coordinates at which the satellite has to point the sensors to collect data, until reaching the end time (which may be the end of the fragment). Hence, the curve function(s) are evaluated at different instants in order to indicate the satellite where to point at. Hence, apart from sending the coefficients of the curve function(s), the planner (if on the ground) may send the start time and/or the end time during which the control module of the satellite has to evaluate the curve function(s), and may send the time interval at which the satellite has to evaluate the curve function(s). In some implementations, the satellite (or a planner onboard a satellite) may calculate one or more of these.

Figure 5:
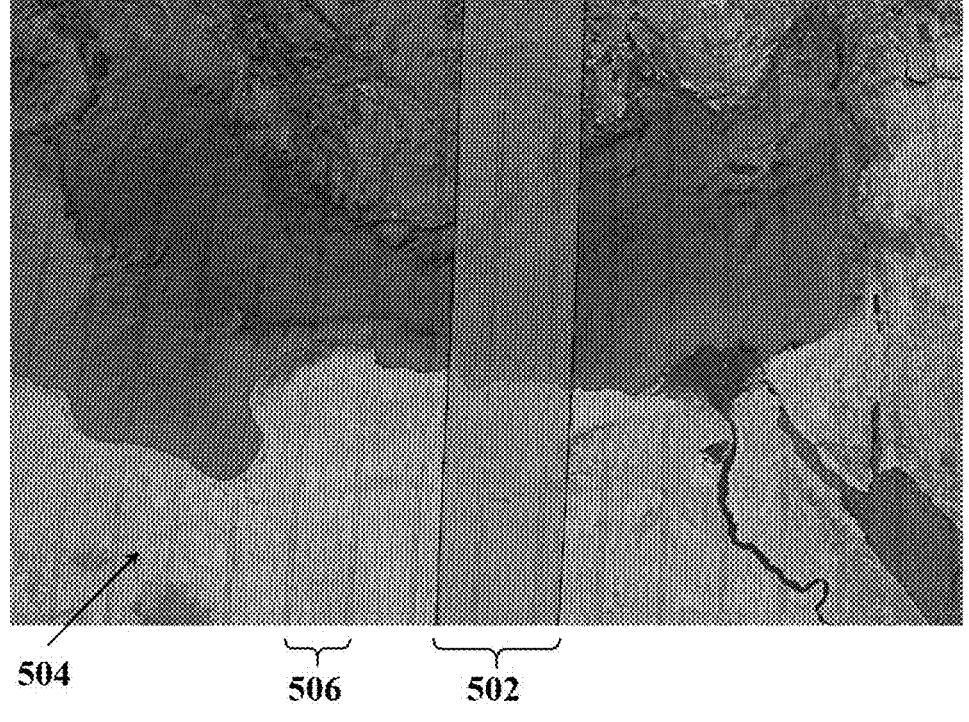
FIG. 5 illustrates how the footprint of the Field of Regard (FoR) considering a 25 degrees maximum off nadir angle includes a plurality of geometric fragments of the geometric ground pattern according to embodiments of the present disclosure.

Once the control module 112 determines what geometric fragments may be captured by the satellite, the satellite may, generally through an Attitude and Orbit Control Subsystem (AOCS) and based on the instructions provided the control module 112 (e.g. a planning comprising curve function coefficients, start time, end time, time intervals), determine and perform the attitude instructions to orient the satellite at the desired points on the surface of the Earth. In some instances, the control module 112 may select one or more geometric fragments within the geometric ground pattern and may direct the imaging sensor to capture images by moving the sensor or the satellite within the maximum ONA ranges. For example, as illustrated in FIG. 5, for a satellite orbiting in a SSO at a given inclination and altitude, the control module 112 may determine for each orbit the orbit path and may build an orbit FoR stripe 502, which in some implementations, the orbit FoR stripe may be a FoR footprint or projection on the surface of the Earth considering the maximum ONA that an imaging sensor on-board the satellite may cover. If one or more geometric fragments 504 are within the orbit FoR stripe 502, the capture of the one or more geometric fragments 504 is feasible. FIG. 5 illustrates how the orbit FoR stripe 502 built based on a FoR computed with a maximum off nadir of 15 degrees includes a plurality of geometric fragments 504 (around 20 geometric fragments) of the geometric ground pattern all along the orbit path. The number of the plurality of geometric fragments is a mere non-limiting example, since the number of geometric fragments depends on the ONA and the FoV of the sensor. In this example, the separation of the corridor reference geometric fragments is selected so that any orbit FoR stripe includes at least one corridor 506.

As explained elsewhere within the Detailed Description, the geometric ground pattern may be determined as a fixed pattern which does not vary in time, or may be changed, so that it is different depending on when it was determined, based for example on the resilience factor. The robustness of this new approach is that by defining the polynomials (an example of curve functions) it is possible to define the geometric fragments of the geometric ground pattern that the satellite needs to follow, hence a change of the geometric ground pattern, is simply translated as a change in the polynomials. Hence, if it is decided that it is necessary to collect data over a certain area on the Earth because it acquired importance due to the emergence of a natural disaster or due to the increased relevance for a client, the geometric ground pattern may change so that the geometric fragments of the new geometric ground pattern cover that area. When the fragmentation changes, this change is effected as a change in the polynomials describing the curve that the satellite has to follow to collect data. One of the main advantages of this approach, is that, in instances in which the planning comprising the polynomials needs to be sent from the ground to the satellite, the amount of information is compact and manageable by a constraint bandwidth, which is usually the case in communications with satellites. Additionally, the calculations implemented by AOCS to compute the maneuvers needed to orient the satellite as determined by the control module 112 are simple and fast by using polynomials. This is important since the control module 112 when on board the satellite is permanently evaluating the polynomials to determine the points on Earth that the satellite has to point at, so this evaluation has to be implemented in a fast and simple manner.

Figure 6A:
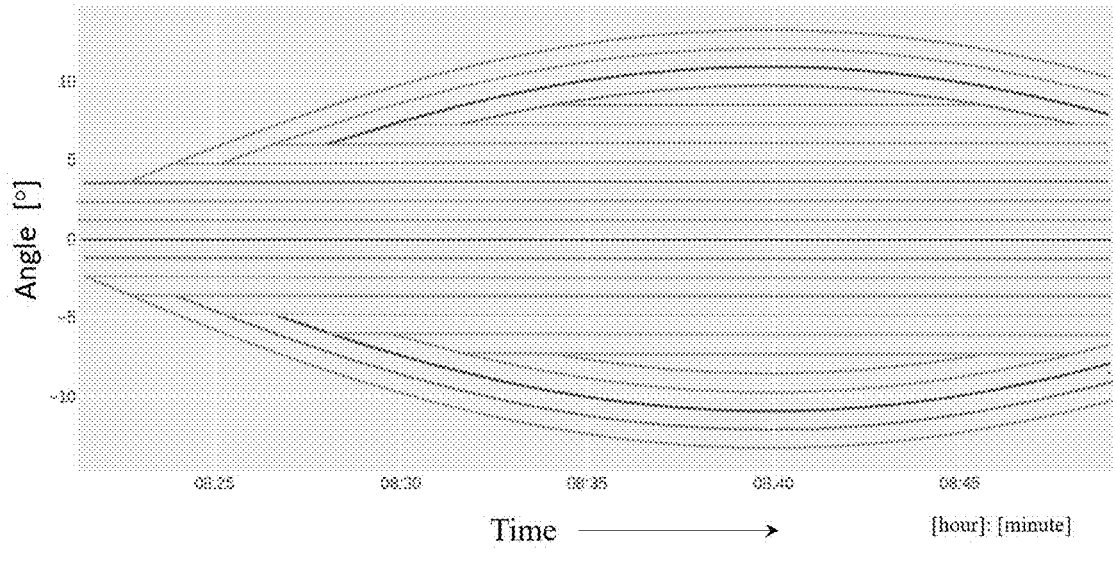
FIGS. 6A and 6B illustrate the across track off-nadir attitude maneuvers according to embodiments of the present disclosure needed to be executed to capture the fragments that are within the FoR, as the across track off-nadir angle as a function of time, showing (in FIG. 6A) the across track off-nadir when the orbit path of a given satellite is aligned with a corridor reference geometric fragments, and (in FIG. 6B) the across track off-nadir when the orbit path of a satellite is aligned with the limit of two corridors.
Figure 6B:
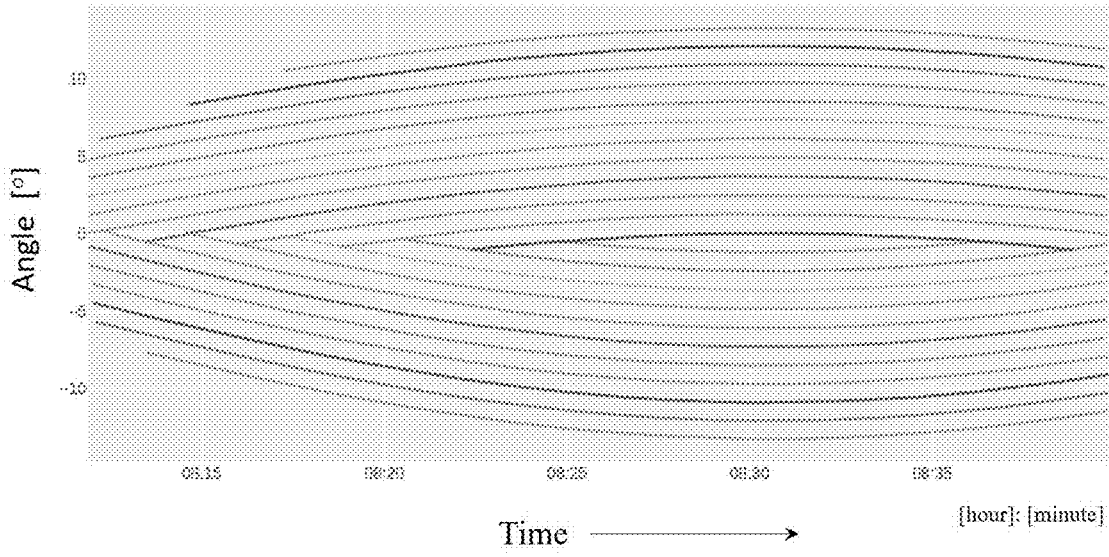

The control module 112 may direct the satellite or the sensor to perform maneuvers calculated by the AOCS to collect data, generally maneuvering within the maximum ONA ranges of the imaging sensor. For example, an imaging sensor on board a satellite may capture geometric fragments at nadir within the geometric ground pattern, but can also capture geometric fragments off-nadir within the same geometric ground pattern and within the FoR. Generally, the geometric ground pattern having contiguous or adjacent geometric fragments that have minimum or no overlap at the equator and reduced overlap towards the poles built as described elsewhere within the Detailed Description better optimizes the amount of geometric fragments that are within the range of the off nadir range for a given orbit. The control module 112 may determine a geometry fragment, and hence a proper attitude maneuver, generally calculated by the AOCS, for a particular capture which may depend on the particular capture plan and priorities that the satellite has. Because for each orbit, a satellite will be able to capture several geometric fragments, a constellation of satellites can be tasked so that each satellite captures the most suitable geometric fragment in such a way as to cover certain areas of the celestial body, or even to completely cover the whole surface of the celestial body, within a certain period of time, such as within a week, or within a day, or the like. By collecting data or preparing the data acquisition plans based on geometric ground patterns as described herein, there is an increased efficiency in the data collection. Furthermore, as illustrated in FIG. 6, the attitude maneuvers needed to follow the orbit paths are feasible and rather smooth. This can be seen by computing the needed across track off-nadir angle of the maneuvers to capture the geometric fragments. FIG. 6A shows the across-track off-nadir when the orbit path of a given satellite is aligned with a corridor reference geometric fragments (center fragment of one corridor), and FIG. 6B shows the across-track off-nadir when the orbit path of a satellite is aligned with the limit of two corridors. As used herein, across-track off-nadir angle may be thought of as the projection of the absolute off-nadir angle to the plane perpendicular to the trajectory of the orbit (the plane whose normal is the velocity vector). It is the component of the off-nadir angle perpendicular to the orbit track. The absolute off-nadir angle is the angle between the segment going from the satellite to the point at nadir (that is the geodesic projection to the surface of the earth of the satellite position) and the segment between the position of the satellite and the point the instrument is pointing at over the surface of the earth.

In some instances the satellite may know which geometric fragments it has to capture (i.e. to collect data over that geometric fragment), with or without knowing which geometric fragments are captured by the remaining satellites. For example, all the satellites of the constellation may have stored in memory the geometric ground pattern wherein each geometric fragment is identifiable, for example by a number. Hence, the control module 112 may assign the geometric fragment numbered 23 to a satellite, and the satellite calculates when it is going to pass over geometric fragment numbered 23 and starts collecting data while it knows that it is passing over the geometric fragment numbered 23. This approach may be useful in instances in which the geometric ground pattern is not expected to change frequently, since each time the geometric ground pattern changes it needs to be updated in all the satellites of the constellation. Conversely, in some instances the satellite may not know which geometric fragments it has to capture, but may be provided with instructions which indicate how to follow a geometric fragment and collect data over that geometric fragment. This is especially useful when the geometric ground pattern is expected to change, since the satellites are provided with a simple manner of following geometric fragments, which is by computing the points on the Earth corresponding to a geometric fragment, for example with polynomials calculated on board the satellite or calculated on the ground and received by the satellite. By operating in this manner, even though the satellite may not know which geometric fragment is capturing, for example it does not know if it is the central geometric fragment of a corridor or one of the sides, it knows how to follow a geometric fragment and collect data over that geometric fragment.

Once the fragmentation is generated (i.e. the geometric ground pattern is determined), all the capture opportunities for a given fleet and time frame may be computed. In general, the planning problem consists of selecting at least one opportunity per orbit per satellite, optimizing some metric. There are several strategies that the control module 112 may use to select at least one opportunity per orbit per satellite to collect data over one or more geometric fragments. For example, the control module 112 may use planning techniques which each day maximize, for each satellite, the area over which the satellite will collect data. Hence the planning, based on the areas from which the satellite collected data that day, chooses the next geometric fragments over which the satellite has to collect data later that day. This may not be an optimal planning since it would have been more convenient to take into account the geometric fragments from which each satellite collected data, but the planning may be sufficiently fast and simple than an optimal technique.

In another example, the control module 112 may use planning techniques so that the satellite covers as many geometric fragments as possible, to optimize some metric associated with the data collection of the entire fleet. The control module 112 may use planning techniques which plan the data collection in an optimal manner, optimizing at least one metric. For example, the control module 112 may implement a Mixed Integer Programming (MIP) model that allows to formalize and also solve the planning problem with any MIP solver. The variables intervening in the model are a set of binary variables, one for each capture opportunity over a fragment. These are True if the satellite s in the orbit o captures the fragment f, and False if that is not the case.

$$\{X_{sof}\}_{s \in S, o \in O, f \in F}$$

The surface, that is, the covered square kilometers of each geometric fragment is a parameter, denoted as $\{s_f\}_{f \in F}$. The model may vary according to what metric is to be optimized. For instance, given a fleet, if the metric includes determining the maximum surface covered by the sensor of the satellites without repetition or overlap in a given time frame, the control module 112 first calculates all the capture opportunities. That is, a variable for each orbit where a satellite can cover a geometric fragment (considering the field of regard of the payload). To make notation easier, a function c is defined, that evaluates to True if the satellite s can cover the fragment f in the orbit o, and False otherwise. In any specific satellite and orbit, there are many geometric fragments to which this function evaluates to True which are all those geometric fragments that fall inside the field of regard footprint of that orbit.

$$c : S \times O \times F \to \{True, False\}$$

The problem may be modeled with the following one or both of the following constraints:

$$\sum_{f \in F : c(s,o,f)} X_{sof} \le 1 \text{ for each } s \in S, o \in O. \tag{1}$$

Wherein Equation 1 tells that for each satellite and orbit, at most one fragment can be captured.

$$\sum_{s \in S, o \in O : c(s,o,f)} X_{sof} \le 1 \text{ for each } f \in F. \tag{2}$$

Wherein Equation 2 tells that each fragment should be captured at most once.

The functional to optimize in this case, which computes the total area covered, is the following:

$$[\text{Maximize}] \sum_{s \in S, o \in O, f \in F : c(s,o,f)} s_f \cdot X_{sof}. \tag{3}$$

Hence, based on the model above, the control module 112 may determine the planning for data collection per satellite and per orbit in an optimal manner that optimizes the total area covered, without repetition or overlap in a given time frame.

In some implementations, the constraint described by equation 2 may not be imposed, given that an active satellite may not be idle in a given orbit just because all visible geometric fragments have been already captured. However, the constraints of equations 1 and 2 are useful for determining, for example, how many satellites are required to get weekly world coverage, or predetermined percentage of coverage, e.g. 95% coverage. This may be done by iteratively incrementing the fleet size, solving the problem with this model, and checking the functional value that provides the covered area. Additionally or alternatively, the constraints of equations 1 and 2 are useful for determining how long it would take to get world coverage (or a predetermined percentage of coverage, e.g. 95% of coverage) with a given fleet. This is done, for example, by iteratively incrementing the time frame, solving the problem with this model, and checking the functional value that provides the covered area.

Additionally or alternatively, in implementations in which the fleet size has been already scaled up to allow the expected periodicity in the remapping, the model may be adapted to take into account the aging of the geometric fragments. For example, the constraint given by equation 2 may be replaced by a constraint (Equation 4) indicating that all fragments must be captured at least once in a predetermined way (basically, reverting the inequality).

$$\sum_{s \in S, o \in O : c(s,o,f)} X_{sof} \ge 1 \text{ for each } f \in F. \tag{4}$$

In an ongoing remapping, for each capture associated with a variable $X_{sof}$ its potential aging may be computed, that is, the time between the last already executed capture and the new capture. We denote these inputs parameters as $\{a_{sof}\}_{s \in S, o \in O, f \in F}$. The functional to optimize is the mean aging of the geometric fragments in the remapping shown as Equation 5.

$$[\text{Minimize}] \quad \sum_{s \in S, o \in O, f \in \mathcal{F}:\, c(s,o,f)} a_{sof} \cdot X_{sof}. \qquad (5)$$

Also, a combination of metrics, such as the area of each geometric fragment multiplied by the aging, could be used as the metric to optimize for a given plan.

In instances in which resources are not enough to capture all geometric fragments in the given time frame, Equation 4 may make the problem unfeasible. Hence, the model may be adapted to require a minimum amount of different geometric fragments by introducing ancillary decision variables with standard MIP modeling techniques. This constraint may be used as the functional to get the maximum number of geometric fragments that can be covered in a first iteration, and the result may be used as a constraint in a next iteration with the full model. The model as described is designed to minimize the aging and to provide one new capture per geometric fragment. Further iterations with the model, using the obtained solution as a constraint may be used to instruct the satellites what to do in the idle orbits.

In some implementations, using the orbit counter for a given satellite to build the no-activity-overlapping constraints may be an over-simplification, and it may be ineffective in remapping many small areas instead of global remapping. To overcome this, the model may be adapted to a time-index variable formulation to express such no-activity-overlapping constraints. This approach may also be extended to handle on-board storage constraints by adding the proper parameters and activities modeling the ground stations support download activities.

The control module 112 may be also responsible for transmitting the collected data to a location independent of the satellite, such as a ground-based station, an aerial or space platform, another satellite of the constellation. The data may comprise raw data, processed data, analysis of the data, and/or portions of data.

In some instances, the Earth observation system 100 may comprise a constellation of satellites equipped with similar or different sensors orbiting around the Earth, wherein some or all the satellites forming the constellation may collect data based on geometric ground patterns, reducing the technical demands of the satellites, as illustrated in the following example.

Example of an Earth Observation System Comprising a Constellation of Satellites

An Earth observation system may comprise a plurality of satellites in a Low Earth orbit (LEO), at for example, 530 km high orbiting in 97 SSO. The satellites of the fleet may be in the same orbit but phased, that is in the same orbit ellipsis but with different true anomalies, in order to collect data from areas over the surface of the Earth. The satellites may include at least one of an imaging sensor, a substance or gas detector, such as a methane detector, on-board, a RF payload, or any other payload for data collection. In some implementations, the satellites may comprise small or low cost satellites having a sensor swath width below 100 km. In some instances, the satellites may have multiple sensors, including at least one sensor with a sensor swath width below 50 km and even as small as 25-15 to 5 km, in order to acquire data with higher resolution, since in general the smaller the sensor swath width the higher the sensor resolution. The satellites and/or the sensors may also swing, allowing data collection within different ranges of variable ONAs.

The system may design a geometric ground pattern to be covered by the satellites, so that at least one capture of at least one satellite of the fleet covers one or more geometric fragments of the geometric ground pattern. One of the advantages of following this approach is that the underlying planning problem turns out to be easier to handle. Once the data collection opportunities over the geometric fragments of the geometric ground pattern are computed, no geometry is needed to solve the planning problem because only an identification of the geometric fragments together with some metadata is needed. In other words, it is not necessary to perform geometric calculations to choose which data collection opportunity enters in the satellite's plan since the system has already designed a geometric ground pattern comprising geometric fragments and, based at least in part on the geometric ground pattern, may plan the collection of the data. Furthermore, the system may design and choose the geometric ground pattern that would lead to a more efficient coverage, and/or a more uniform collection of data.

In some implementations, the system may plan the data collection (e.g. image captures) based on the footprint of previous data collections, that is, what has been covered previously. For example, a satellite capturing images may maintain a heatmap of the entire area to cover, indicating the aging of each point. The aging is how old is the last image that covers that point. It is possible to follow a traditional approach to collect data, defining what to cover with each satellite particularly for each pass. To decide what each satellite will cover next, the satellites search for the capture in the next orbit that maximizes the oldest part of the area in the heatmap. After the capture is defined, the heatmap is updated accordingly. Following a traditional approach, the capture is generated dynamically and the coverage stripe polygon is built from the actual capture, the full swath of the real capture is considered, including the increment due to the capture off-nadir angle. In principle, every orbit over land may be used and there is no restriction of covering exactly one of many predefined stripes, that could be zero if the pattern is wrongly designed. However, this traditional approach for collecting data and solving the planning problem can be inefficient when the heatmap starts to be populated. Early locally optimal but globally wrong decisions can have dramatic impact in the overall coverage. For instance, if the optimization of coverage of two previous captures generated a very thin portion of the land that is not covered in the middle, this thin portion still needs to be covered. And when this portion is covered, the used capture is very inefficient because it is covering a very little amount of new area. Consequently, the planning problem turns very complex and the geometric optimization is mixed with the planning optimization problem. It may be even hard and extremely memory and processing expensive to maintain the heatmap, in situations in which it is desirable to cover large areas with very thin stripes. On the contrary, following an approach in which the acquisition plan is based on a geometric ground pattern as described throughout this Detailed Description, allows the use of heatmaps to optimize the acquisition given that the heatmap may be discrete, in the sense that new captures will cover distinct geometric fragments of the geometric ground pattern. In some implementations, it is possible to identify and/or associate data or metadata with the geometric fragments of the geometric ground pattern. Furthermore, the heatmap or even the catalog of collected data is easier to navigate and it is also easier to get time series of the same land area, ultimately providing a better end user experience.

In relation to the planning problem, for a given concrete orbit of a satellite in the fleet, there will be several geometric fragments that could be potentially captured, because many of the geometric fragments will be inside the field of regard (that is the maximum off nadir ranges) all along their extension. If the satellites of the fleet of the Earth observation system were directed to capture images at nadir, it would be necessary to keep the satellites separated in the exact distance that makes one satellite instrument swath to be exactly next to the next satellite swath to avoid the overlapping between the instruments swaths of consecutive satellites in the formation. Doing that would require a flawless station keeping that is at least impractical, not to say very difficult for a fleet of tens of satellites. For that reason, it is necessary to add proper attitude maneuvering to adjust that error in order to avoid unnecessary overlapping between consecutive passes of different satellites.

With a swath below 100 kms, capturing all the time at nadir with a sun-synchronous low-orbit large fleet to map or remap the world would be a very inefficient approach, especially if the satellites capture high resolution data, such as high resolution images which generally include large amounts of data that may overload the satellites, since these are systems with limited resources, especially in terms of data storage and download capacity when transmitted to a location independent of the satellite such as a ground station. By following the geometric ground pattern approach, a global remapping with a large fleet of satellites with limited resources is more efficient in terms of the coverage, allowing a cost-effective design for the satellites of the fleet capable of capturing high resolution images.

Figure 7:
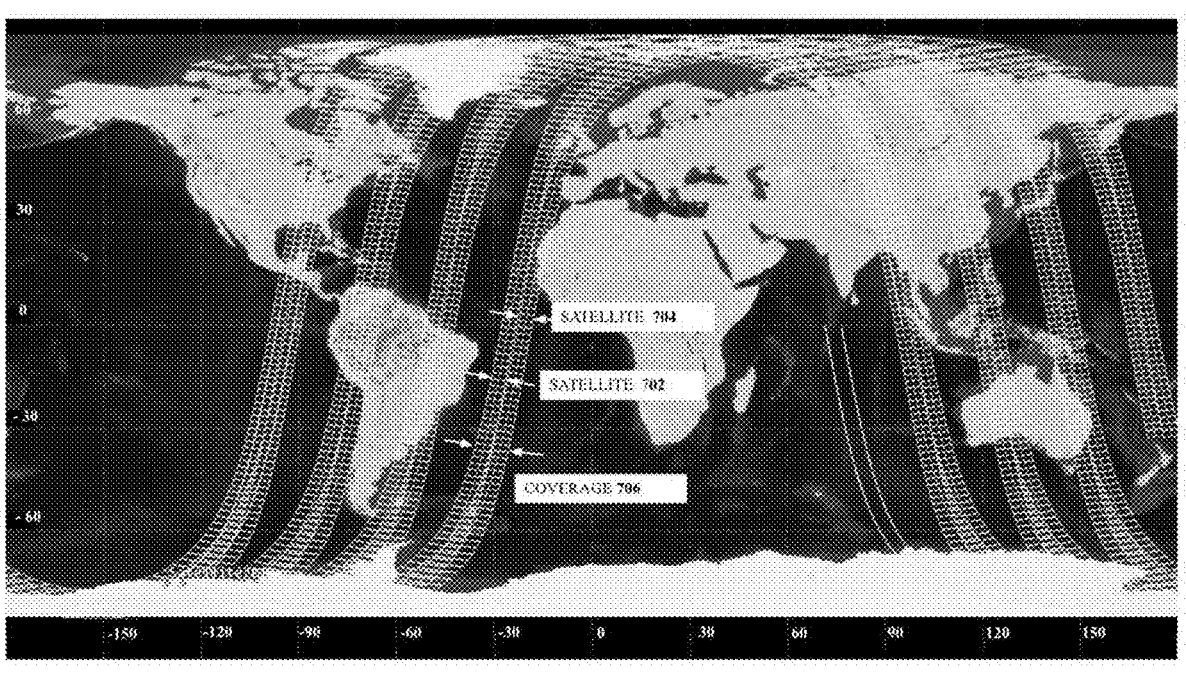
FIG. 7 shows the ground tracks of the satellites of a constellation of satellites in sun-synchronous orbit (SSO) and the footprints of each satellite.

In some instances, the collection of data may be planned based on a predetermined geometric ground pattern, which may allow revisiting regions at predetermined frequencies. The geometric ground pattern may be determined based on the satellite configuration within the constellation, taking into account their altitudes and inclinations of their orbital planes. For example, FIG. 7 illustrates a constellation of satellites 702 and 704 in SSO showing the ground tracks of the satellites and the coverage of each satellite. The satellites orbit the Earth about 15 to 16 times a day and the Earth rotates completely in 24 hours. Hence, during a particular day, some parts of the Earth may be revisited once (regions closer to the Equator where there is no overlap, some may be revisited twice (regions closer to the poles) and some may not be accessed that day (those that are not below the coverage 706 of the satellites). To increase the efficiency of the coverage, the satellite may plan the collection of data based on a geometric ground pattern comprising reference geometric fragments and geometric fragments parallel and adjacent to the reference geometric fragments. Each reference geometric fragment may resemble the orbit path of at least one satellite having a minimum swath, and the parallel geometric fragments forming the corridor may be added until the parallel geometric fragments overlap at the line of the equator with a predetermined degree of overlap. In some instances, a minimum overlap is desirable because it allows having some margin in the relative positioning on the satellites to collect data. The reference geometric fragments may be separated from each other based on the FoR width and the size of the parallel geometric fragments, and hence the size of the corridors. Wider corridors lead to more efficient coverage, but reduce the amount of opportunities per orbit. This in turn, has a negative impact in the remap frequencies, or in the amount of satellites needed to cover a region in a given time frame.

A constellation of small or low cost satellites is associated with more challenges associated with inherent characteristics of these systems such as the reduced swath widths, FoVs or FoRs, and power, thermal, and data download constraints. However, an advantage of strategies based on geometric ground patterns described throughout the present disclosure is that the planning for data collection is highly simplified since the sensors or satellites directed to collect data based on the geometric ground patterns may maneuver within the maximum ONA and capture data performing maneuvers which may not necessarily be typical off-nadir maneuvers or maneuvers following the orbit of the satellite. Generally, the capture opportunities for a given orbit and the required maneuvering to capture the data, may be determined by the design of the geometric ground pattern and the size and variety of the spacecraft constellation. In some implementations, the geometric fragments of the geometric ground pattern are designed using the minimum swath at nadir, because a priori the off nadir ranges that will be used to cover the geometric fragment is unknown, providing more maneuverability alternatives.

Additionally, in some implementations it is desirable to reduce the size of the geometric fragments comprising geometric ground pattern, so that the satellites collecting the geometric fragments may reduce or lower the technical requirements of the satellite resources such as the power spent by the satellites when executing the data acquisition plan due to shorter data capture durations.

In some instances, the satellites may plan the collection of data based on a geometric ground pattern to map or remap the Earth at predetermined frequencies. The number of satellites forming the constellation may be determined based on the frequency or period of time at which it is desirable to map or remap the surface of the Earth. In some instances, the frequency may be defined in hours, days, weeks, and so forth, and may be chosen so as to guarantee the coverage of portions or all the surface of the Earth.

In some instances, the acquisition plan may be reconfigured on-board the satellites. The possibility of being reconfigured on-board allows the planet observation system 100 to adapt to particular requirements determined for example by the modification in the number of satellites due to the incorporation or loss of new satellites to the constellation, or due to some satellites of the constellation being at some point used for other tasks. By allowing the reconfiguration of the acquisition plan onboard, also less requirements are imposed on the satellites for contacting the ground stations. In some implementations, the satellites of the planet observation system 100 may configure or reconfigure the acquisition plan based at least in part on the resilience factor. For example, a satellite may follow an acquisition plan which includes capturing images over particular geometric fragments of the geometric ground pattern. The geometric ground pattern may have a predetermined resilience factor which may represent, for instance, an extra 10-20% percentage of overlap. The overlap may be distributed so that the geometric ground pattern allocates a 10-15% percentage of overlap to areas of the Earth having a higher number of client requests. The overlap provides more opportunities to capture images and the fact that it is distributed over geometric fragments which may be of higher interest or importance due to, for example, the higher number of client requests allows the satellite to reconfigure the acquisition plan so that it has more opportunities to capture images over more important areas. This may be useful in scenarios in which for example an alert is generated when fire or any other unusual activity is detected on a specific place and the clients place more requests to obtain data from that specific place.

In a non-limiting example, after determining a geometric ground pattern as described throughout the Detailed Description, the Earth observation system 100 may assign at least one fragment of the geometric ground pattern to each satellite of the constellation by determining the orbit, velocity and/or position of the satellite orbiting around the Earth, for example using telemetry or TLE information, and determining, based on orbit, velocity and/or position, the coefficients of the polynomials describing one or more points on the surface of the Earth defining the geometric fragment over which the satellite has to collect data. If the planner is on the ground, it may send instructions to the satellite, the instructions including the coefficients of the polynomials and the time at which the satellite has to start and/or end collecting data. Once the satellite receives these instructions, the AOCS on board the satellite may calculate the maneuvers required to orient the satellite to the points determined by the polynomials, starting/ending at the time determined by the planner.

Example Operations for Efficient Planet Observation

Figure 8:
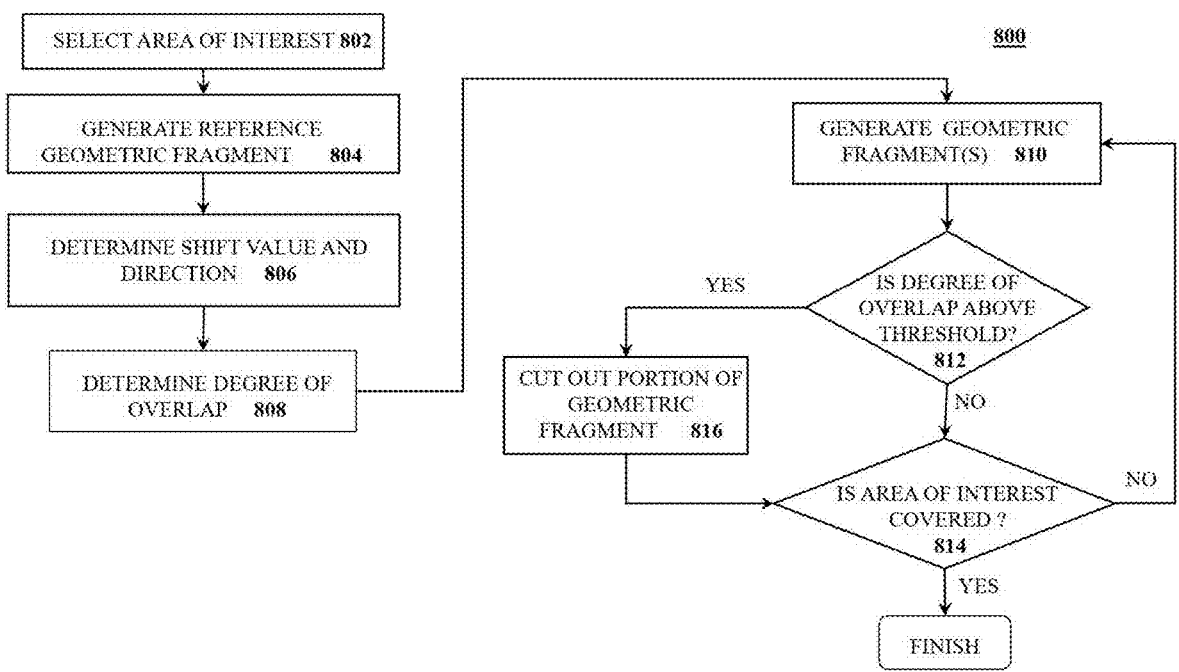
FIG. 8 is a flow diagram showing an example overview process for building a geometric ground pattern according to embodiments of the present disclosure.

FIGS. 8 and 9 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), a programmable logic device, such as a field programmable gate array (FPGA), graphics processing unit (GPU), tensor processing unit (TPU), digital signal processors (DSPs), or central processing units (CPUs). Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard a spacecraft or ground-based station, or may be shared between multiple systems located onboard the spacecraft or ground-based systems.

FIG. 8 is a flow diagram showing an example overview process 800 for building a geometric ground pattern. At 802, an area of interest may be selected. The area of interest may be any area over the surface of a celestial body, such as continents on the Earth. In some implementations the area of interest may be large areas or the whole surface of the Earth, generally illuminated regions, for example for mapping or remapping the Earth. In some instances, an area of interest may be the projection of a volume over the surface of a celestial body, for example when the purpose is to detect methane contained in certain regions above the surface of the Earth.

At 804, at least one reference geometric fragment may be generated. The reference geometric fragment may be determined based on a reference path. The reference path may be an illuminated orbit path of any satellite of the fleet, whose orbit has been propagated in a predetermined time. The orbit path of the satellite may correspond to the orbit path of a closed orbit which may be an elliptical orbit or a circular orbit, including but not limited to, a Molniya orbit, a polar orbit, a nearly polar orbit, a sun-synchronous orbit, and so forth. A skilled person would understand that other types of closed orbits may be used to build the at least one reference geometric fragment. The predetermined time may be any particular time, in some instances related to at least one target and/or geographical location. For example, the reference geometric fragment may be the stripe generated over the surface of the Earth with a reference path considering the field of view of the sensor, preferably looking at nadir. In implementations in which more than one reference geometric fragment is generated, the reference geometric fragments are referred to as corridor reference geometric fragments and each corridor reference geometric fragment acts as the center fragment of a corridor. A corridor refers to a subset comprising a corridor reference geometric fragment and geometric fragments added iteratively until a certain condition is met, for example until a threshold is reached.

At 806, at least one shift value and/or shift direction may be determined. The term shift refers to the displacement of a stripe generated when the reference path is moved a certain magnitude. The shift value and/or shift direction may be determined based on the degree of overlap of the geometric fragments of the resulting geometric ground pattern. For example, the shift may be a shift along the longitude direction and the shift value may be a set as a minimum magnitude that when the reference path is shifted the associated stripes have minimum or no overlap along the longitude of the equator. In some instances, the shift value may be equivalent to the instrument swath width at nadir at the equator, or a multiple thereof. The shift value and/or shift direction may be constant so that all generated stripes have the same value and direction of displacement, or may be different in magnitude and/or direction.

At 808, at least one degree of overlap may be determined. The degree of overlap may be determined based at least on one of the shift value, the shift direction, and the geometric fragment shape, or any combination. For example, if the geometric fragment has the shape of a stripe, the overlap between geometric fragments may be determined along the width of the stripe, along the length of the stripe, or along a section of the stripe. Additionally or alternatively, the degree of overlap may be the same or similar for all shift directions, but in some instances a different degree of overlap may be determined based on the shape of the geometric fragment. The degree of overlap may be determined based on the resources of the constellation, generally relevant when the objective is to map or remap the surface of the Earth or large areas or when it is desirable to control the amount of redundant data that may be collected from an area of interest. In some implementations, the degree of overlap may be determined based on the resilience factor, for example to allow the satellite to plan the acquisition based on the resilience factor.

In some instances, it is desirable to have no gap or area of overlap between the (reference) geometric fragments, whereas in other instances it is desirable to have a certain area or degree of overlap of not more than a threshold level of overlap. The condition of no gap or certain area or degree of overlap, may be a condition to be met only in one direction, for example for the longitudes along the direction of latitude 0° of the equator, so that there is no or minimum overlap for the longitudes along the latitude 0° of the equator as shown in FIG. 9A or constant degree of overlap for the longitudes along the latitude 0° of the equator as shown in FIG. 9B. In some implementations, the condition may be a condition to be met along more than one direction, for example the condition of no or minimum degree of overlap (as shown in FIG. 9C) or a constant degree of overlap (as shown in FIG. 9D) may be met for the longitudes along the latitude 0° of the equator and also for the longitudes from the latitudes from the equator (latitude 0°) to the poles (latitude 90° or –90°). This is the case, for example, of the contiguous pseudo-parallel geometric fragments that do not cross each other near the poles (FIG. 9C) or cross each other with a predetermined degree of overlap (FIG. 9D).

At 810, at least one geometric fragment may be generated. The generated geometric fragments may be generated based at least in part on characteristics of the sensor, a shift value, degree of overlap, and/or shift direction. The at least one geometric fragment may be added to the set by placing the at least one geometric fragment at a distance equal to the shift value or a multiple thereof. Alternatively or additionally, the at least one geometric fragment may be added to the set in the direction of the shift direction. For example, if the shift direction is the longitudinal direction, the at least one geometric fragment may be added to the set in the direction along the latitude 0° of the equator. The generated geometric fragments may be iteratively added to form the geometric ground pattern so that on each iteration the at least one geometric fragment may be placed contiguous to a previously generated geometric fragment. In some instances, a pair of geometric fragments may be generated and placed so that each geometric fragment is placed contiguous to a previously generated geometric fragment and at a direction opposite to each other. In other words, if two geometric fragments are added contiguous to a reference geometric fragment, one geometric fragment may be added to the right of the reference geometric fragment and the other to the left of the reference geometric fragment, and similarly for every new pair of geometric fragments. The reference geometric fragment and the iteratively added geometric fragment may form a set of geometric fragments, which is referred to as corridor when the set includes a corridor reference geometric fragment as well as the iteratively added geometric fragment(s). The geometric fragments of each corridor may be generated and added as explained above, but simultaneously for all corridors.

At 812, the control system may determine whether the degree of overlap between the geometric fragments or between corridors is above, below or within a threshold value. In some instances, the control system may determine the degree of overlap based on the shift direction and/or shift value. For example, the control system may determine the degree of overlap along the latitude 0° of the equator. In some instances, the control system may determine the degree of overlap of pseudo-parallel geometric fragments along the direction of increasing (or decreasing) latitudes from the equator to the poles, so that when it detects that two corridors start crossing each other, the control system may determine the degree of overlap of the geometric fragments of the corridors and compare it with a stored, received or set threshold level of overlap.

If the degree of overlap is not above a threshold value (the "NO" arrow), at 814, the control system may determine whether the area of interest is already covered by the generated and added geometric fragments. If the area of interest is already covered (the "YES" arrow), no more geometric fragments are generated or added and the process of building the geometric ground pattern is finished. On the contrary, if the area of interest is not yet covered (the "NO" arrow), at 810, at least one geometric fragment may be generated and added to the geometric ground pattern. If the degree of overlap is above a threshold value (the "YES" arrow), at 816, the control system may cut out one or more portions of the geometric fragment that exceeds the threshold value and add the geometric fragment with the cut out portion(s) to the geometric ground pattern. After adding the geometric fragments, at 814, the control system may determine whether or not the area of interest is covered. As indicated previously, the processes according to various embodiments of the present disclosure may include only some of the operations depicted in the logical flow graph. For example, in some instances it is not necessary to select an area of interest as illustrated in the operation 802, and the process may perform a predetermined number of iterations to generate a geometric ground pattern. Also, the operation 814 may be optional and other alternative options may be feasible for considering the geometric ground pattern finished such as the degree of overlap, number of fragments, or other coverage or geometric criteria. By operating in this manner, the control system may iteratively add geometric fragments to a reference geometric fragment while the degree of overlap is zero or within a threshold value, and may cut out geometric fragment portions or finish the process of building the geometric ground pattern.

FIG. 10 is a flow diagram showing an example overview process 1000 for collecting data from part or all the surface of the Earth (i.e. a celestial body) using at least one sensor on-board at least one satellite. In some instances, the process may be used for mapping or remapping part or all the surface of the Earth at predetermined frequencies with a constellation of satellites. Generally, the extent of the surface to be covered may depend on the application (e.g. monitoring on the land or over the water), data to be collected, characteristics of the surface (e.g. water or land), regions, areas or points of interest, and so forth. At 1002 a geometric ground pattern comprising geometric fragments may be selected. A geometric ground pattern determined as explained throughout the Detailed Description may be selected, based on the satellite constellation configuration, taking into account the arrangement of the satellites including the altitudes and inclinations of the orbital planes, the characteristics of the sensors on-board the satellite, the areas to be covered and/or the frequency of the data collection for instance, if it is for mapping or remapping the surface at predetermined frequencies. In some instances, the satellites or a control system (or module) controlling the constellation may choose the geometric ground pattern based on an attribute such as, but not limited to, the shape of the geometric fragments, the degree of overlap, the resilience factor, or any other characteristic that may be used to distinguish one geometric ground pattern from another. The geometric ground pattern may be stored in one or more memories, so that the satellite or the control system/module may access it. In some implementations, the geometric ground pattern may not be stored on board the satellite but implicitly or explicitly sent from the ground to the satellite. The geometric ground pattern may be implicitly sent to the satellite, for example, when the satellite receives, from the ground or from another satellite, planning instructions which indicate over which fragment(s) of the geometric ground pattern the satellite has to start collecting data. In this manner, the satellite does not store the whole geometric ground pattern, but it stores part of the geometric ground pattern by storing information about the fragments over which it has to collect data. In some implementations, the satellite may build a geometric ground pattern on board the satellite, based on an analysis or on a priori information such as a heat map. The satellite may have a catalog including geometric ground patterns uploaded from the ground and built on board the satellite. Similarly, if the system includes parts on the ground and parts on the space, the catalog may be stored on the ground and may also include geometric ground patterns built by one or more satellites.

At 1004, the data collection opportunities for at least one satellite is determined. The data collection opportunities may be determined based on the selected geometric ground pattern and the characteristics of the at least one sensor on-board the at least one satellite. For example, the control system/module controlling a constellation of satellites equipped with imaging systems may determine, for each orbit of each satellite, the geometric fragments of the selected geometric ground pattern which can be covered by each satellite orbit FoR stripe, within the maximum off-nadir range. The control system/module may also determine the data collection opportunities by determining the maneuvers the at least one satellite needs to perform to collect data over the geometric fragments of the geometric ground pattern. For example, the control system/module may compute for each orbit the orbit path, and build a FoR footprint considering the maximum ONA allowed. If a geometric fragment is completely inside the FoR footprint, the satellite may capture data and it may become a data collection opportunity. The satellite may execute different maneuvers within the FoR to collect data. In some instances, if a geometric fragment is not completely inside the FoR footprint, one satellite may capture data over portions of the geometric fragment and other satellites may capture other portions of the same geometric fragment. In an example, the data collection opportunities may be determined by assigning at least one fragment of the geometric ground pattern to each satellite of the constellation by determining the orbit, velocity and/or position of the satellite orbiting around the Earth, for example using telemetry or TLE information, and determining, based on orbit, velocity and/or position, coefficients of curve functions, such as polynomials, describing one or more points on the surface of the Earth defining the fragment over which the satellite has to collect data, as explained elsewhere in the Detailed Description.

At 1006, one or more data collection opportunities are selected for the at least one satellite. At this point, the control system/module may decide what geometric fragments the at least one satellite will select to collect data over the selected geometric fragments. For example, the control system/module may optimize the image captures by planning which images will be captured by each satellite of the fleet by selecting over which geometric fragments of the selected geometric ground pattern each of the satellites will capture images, so that the satellites may capture images while orbiting over the selected geometric fragments. In some implementations, the control system/module may assign identification labels to the geometric fragments and may plan the captures of the satellites by specifying the identification labels of geometric fragments. For example, the control system/module may assign the letter A, B and C to three different geometric fragments and may task a first satellite of the fleet to capture images over fragment A, a second satellite of the fleet to capture images and/or detect gasses over the geometric fragment B, and a third satellite of the fleet to captures images over geometric fragment C. The fact that the data collection opportunities may be based on a geometric ground pattern formed by geometric fragments which may be seen as an artificially generated orbit path stripes that are not generated from a real orbit, but they emulate the orbit shape very accurately, allows to optimize the planning of the data collection, since the idea is that if an orbit path of a given satellite in a particular orbit crosses the middle (along the longitudinal direction) of one of the geometric fragments, that orbit path stripe will be extremely similar to the geometric fragment so that the satellite maximizes the opportunities to collect data. In other implementations, the control system/module may select the data collection opportunities as fragment(s) from the geometric ground pattern over which the at least one satellite has to collect data. For example, if the control system/module is on the ground, it may send instructions to the at least one satellite, the instructions including the coefficients of curve functions, such as polynomials, and the time at which the at least one satellite has to start collecting data and/or finish collecting data, as explained elsewhere in the Detailed Description. Once the at least one satellite receives these instructions, the AOCS on board the at least one satellite may calculate the maneuvers required to orient the at least one satellite to the points determined by the curve functions, starting and finishing at the time determined by the control system/module.

At 1008, the collected data may be stored and/or transmitted to another location. The data may be stored in memory on-board the satellite for further processing, for transmission to another location, or for analysis. In some instances, the data may be also processed on-board the satellite. The processing may be performed after or before the storage or transmission of data.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In the descriptions above and in the claims, phrases such as "at least one of" or "one or more of" may occur followed by a conjunctive list of elements or features. The term "and/or"

may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B:", "at least one of A or B:", "one or more of A and B:", and "A and/or B" are each intended to mean "A alone, B alone, or A and B together." A similar interpretation is also intended for lists including three or more items. For example, the phrases "at least one of A, B, and C:", "one or more of A, B, and C:" and "A, B, and/or C" are each intended to mean "A alone, B alone, C alone, A and B together, A and C together, B and C together, or A and B and C together." In addition, use of the term "based on" above and in the claims is intended to mean "based at least in part on", such that an unrecited feature or element is also permissible.

Conclusion

The subject matter described herein can be embodied in systems, apparatus, methods, and/or articles depending on the desired configuration. Although the disclosure uses language that is specific to structural features and/or methodological acts, the invention is not limited to the specific features or acts described. Rather, the specific features and acts are disclosed as illustrative forms of implementing the subject matter described herein. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A planet observation system, the system comprising:
at least one vehicle comprising one or more sensors, the at least one vehicle configured to follow a trajectory around a celestial body; and
a control system comprising memory and one or more processors, the memory including one or more modules that are executable by the one or more processors to:
direct, based at least in part on a geometric ground pattern covering partially or wholly a surface or volume of the celestial body, the one or more sensors to collect data; and
store the data in memory on-board the at least one vehicle and/or transmit the data to another location, wherein the geometric ground pattern is determined by:
a) defining a plurality of corridor reference geometric fragments being at a first distance from each other at a latitude corresponding to an equator;
b) defining at least one additional geometric fragment for each corridor reference geometric fragment, such that each of the additional geometric fragments longitudinally extends respectively adjacent to one corridor reference geometric fragment, wherein the additional geometric fragments are at a second distance from each other, smaller than the first distance;
c) if the additional geometric fragments overlap with each other more than a threshold level of overlap at any point within the geometric ground pattern, at least partially removing overlapping point(s) and/or area(s) from the additional geometric fragments; and
d) repeating steps b) and c) to define additional geometric fragments adjacent to at least one of the previously defined additional geometric fragments, until the additional geometric fragments overlap each other at the equator's latitude a certain threshold level of overlap or until covering a predetermined area on the surface of the celestial body.

2. The system according to claim 1, wherein the first distance is determined based on characteristics of the at least one vehicle and/or at least one payload of the at least one vehicle.

3. The system according to claim 2, wherein the characteristics include at least one of an inclination of the at least one vehicle, an altitude of the at least one vehicle, a field of regard of a sensor of the one or more sensors on board the at least one vehicle, or a field of view of the one or more sensors.

4. The system according to claim 1, wherein the at least one vehicle's trajectory follows a sun-synchronous orbit, and wherein the one or more modules are further executable by the one or more processors to determine the geometric ground pattern based on:
defining the plurality of corridor reference geometric fragments following a direction coverable by the sun-synchronous orbit over predetermined areas on the surface of the celestial body, and
wherein the overlap of the at least one additional geometric fragment with at least one corridor reference geometric fragment of the plurality of corridor reference geometric fragments along the direction transverse to the longitudinal direction is less than a threshold level of overlap along the latitude 0° of the equator.

5. The system according to claim 4, wherein the at least one corridor reference geometric fragment has a shape longitudinally extending over the predetermined areas, and the at least one additional geometric fragment and the at least one corridor reference geometric fragment have the respective bordering edges at a same border distance apart at every point along the respective bordering edges.

6. The system according to claim 1, wherein the one or more modules are further executable by the one or more processors to determine the geometric ground pattern dynamically, based at least in part on information about previous data collections or heatmaps.

7. The system according to claim 6, wherein the heatmap includes information of at least one of an aging value of a point on or above the surface of the celestial body, one or more geographical areas of interest to clients, one or more applications, one or more tasks, or a number of tasks to be performed by the at least one vehicle.

8. The system according to claim 1, wherein the geometric ground pattern is determined as a pattern of a plurality of geometric fragments and is determined dynamically by determining one or more overlapping zones and/or a degree of overlap between the plurality of geometric fragments; and by associating the overlapping zones and/or the degree of overlap with areas or points on or above the surface of the celestial body.

9. The system according to claim 1, wherein the geometric ground pattern comprises a plurality of geometric fragments and the one or more modules are further executable by the one or more processors to:

assign at least one geometric fragment from the plurality of geometric fragments to the at least one vehicle;

determine, based at least in part on the at least one geometric fragment, at least one curve function, determine, based on the at least one curve function, attitude maneuvers; and orient the one or more sensors using, at least in part, the attitude maneuvers;

wherein the at least one curve function provides at least one point on the surface of the celestial body of the at least one geometric fragment and the one or more sensors are oriented towards the at least one point on the surface of the celestial body.

10. The system according to claim 9, wherein the one or more modules are further executable by the one or more processors to determine a start time and/or an end time for collecting data.

11. The system according to claim 9, wherein the at least one curve function is at least one polynomial including one or more coefficients describing one or more points on the surface of the Earth defining the at least one geometric fragment over which the at least one vehicle has to collect data.

12. The system according to claim 1, wherein the one or more modules are further executable by the one or more processors to:

select at least one opportunity, per orbit, per satellite, to collect data over one or more geometric fragments of the geometric ground pattern, optimizing a metric.

13. The system according to claim 12, wherein the metric is a metric associated with the data collection of a plurality of vehicles including the at least one vehicle, and is at least one of a maximum area over which the at least one vehicle collects data, or an aging value of a geometric fragment, or a combination of both.

14. The system according to claim 1, comprising a plurality of vehicles, the plurality of vehicles forming a constellation comprising artificial satellites or spaceships, or combinations thereof; and wherein the plurality of vehicles orbit in different sun-synchronous orbital planes having altitudes differing from each other less than an altitude difference threshold, and inclinations differing from each other less than an inclination difference threshold; and wherein the one or more modules are further executable by the one or more processors to determine the geometric ground pattern based on a configuration of the plurality of vehicles within the constellation, and/or on characteristics of the one or more sensors onboard the at least one vehicle of the plurality of vehicles.

15. A system for planet observation, the system comprising:

one or more satellites of a constellation of satellites configured to follow a trajectory around a celestial body;

one or more sensors onboard the one or more satellites;

a geometric ground pattern comprising a plurality of geometric fragments; and a control system comprising memory and one or more processors, the memory including one or more modules that are executable by the one or more processors to:

assign at least one geometric fragment from the plurality of geometric fragments to the one or more satellites;

determine, based at least in part on the at least one geometric fragment, at least one curve function;

determine, based on the at least one curve function, attitude maneuvers;

orient the one or more sensors using, at least in part, the attitude maneuvers;

collect data by the one or more sensors onboard the one or more satellites; and store the data in memory onboard the one or more satellites and/or transmitting the data from the one or more satellites to another location;

wherein the at least one curve function provides at least one point on the surface of the celestial body of the at least one geometric fragment and the one or more sensors are oriented towards the at least one point on the surface of the celestial body.

16. The system according to claim 15, wherein the geometric ground pattern is determined as a dynamic ground pattern based on previous information stored or collected by the one or more satellites, or as a fixed geometric ground pattern.

17. The system according to claim 15, wherein the geometric ground pattern is determined by:

a) defining at least one reference geometric fragment having a shape longitudinally extending over predetermined areas over the surface of the celestial body following a direction coverable by the trajectory over said predetermined areas; and b) based at least in part on mathematical calculations and on characteristics of the at least one reference geometric fragment, defining an additional geometric fragment extending adjacent to the at least one reference geometric fragment, with an overlap with the reference geometric fragment along the longitudinal direction being less than a threshold level of overlap;

wherein the overlap is determined based on a resilience factor, and wherein the overlap has the same value at all points along the longitudinal direction between the additional geometric fragment and the reference geometric fragment, or wherein the overlap has different values at different points along the longitudinal direction.

18. A computer-implemented method of designing a geometric ground pattern for at least one vehicle configured to orbit around a celestial body, the method comprising the steps of:

a) defining a plurality of corridor reference geometric fragments being at a first distance from each other at a latitude corresponding to the equator, b) defining at least one additional geometric fragment for each corridor reference geometric fragment, such that each of the additional geometric fragments longitudinally extends respectively adjacent to one reference geometric fragment, wherein the additional geometric fragments are at a second distance from each other, smaller than the first distance, c) if the additional geometric fragments overlap with each other more than a threshold level of overlap at any point within the geometric ground pattern, at least partially removing overlapping point(s) and/or areas from the additional geometric fragments; and d) repeating steps b) and c) to define additional geometric fragments adjacent to at least one of the previously defined additional geometric fragments, until the additional geometric fragments overlap each other at the equator's latitude a certain threshold level of overlap or until covering a predetermined area on the surface of the celestial body.

19. The method according to claim 18, further comprising defining at least one reference path having a shape covering predetermined areas on or over a surface of the celestial body following a direction coverable by a direction followed by the orbit over said predetermined areas, and defining the plurality of the corridor reference geometric fragments based on the at least one reference path.

20. The method according to claim 18, wherein the at least one additional geometric fragment and the reference geometric fragment have the respective bordering edges at a same border distance apart at every point along the respective bordering edges.

\* \* \* \* \*